(12) United States Patent
Kiyotani

(10) Patent No.: US 7,715,999 B2
(45) Date of Patent: May 11, 2010

(54) SURFACE TEXTURE MEASURING INSTRUMENT

(75) Inventor: Shingo Kiyotani, Tsukuba (JP)

(73) Assignee: Mitutoyo Corporation, Kawasaki-shi (JP)

( * ) Notice: Subject to any disclaimer, the term of this patent is extended or adjusted under 35 U.S.C. 154(b) by 46 days.

(21) Appl. No.: 12/184,471

(22) Filed: Aug. 1, 2008

(65) Prior Publication Data

US 2009/0037128 A1   Feb. 5, 2009

(30) Foreign Application Priority Data

Aug. 3, 2007   (JP) .............................. 2007-202687

(51) Int. Cl.
*G01B 5/008* (2006.01)

(52) U.S. Cl. .......................... 702/95; 702/94; 702/150; 700/275; 703/2; 703/7; 33/503; 33/504; 33/556; 33/558.01; 33/559; 33/561; 73/104; 73/105

(58) Field of Classification Search .................. 702/94, 702/95, 150; 700/275; 703/2, 7; 33/503, 33/504, 556, 558, 558.01, 559, 561; 73/104, 73/105

See application file for complete search history.

(56) References Cited

U.S. PATENT DOCUMENTS

| 5,579,246 | A | 11/1996 | Ebersbach et al. |
| 5,966,681 | A | 10/1999 | Bernhardt et al. |
| 2002/0029119 | A1 | 3/2002 | Lotze et al. |
| 2005/0111725 | A1* | 5/2005 | Noda et al. .................. 382/141 |

FOREIGN PATENT DOCUMENTS

| EP | 0 684 448 | 11/1995 |
| EP | 1 662 352 | 5/2006 |
| JP | 05-256640 | 10/1993 |
| JP | 07-324928 | 12/1995 |
| JP | 07-324929 | 12/1995 |

\* cited by examiner

*Primary Examiner*—Sujoy K Kundu
(74) *Attorney, Agent, or Firm*—Rankin, Hill & Clark LLP

(57) ABSTRACT

A surface texture measuring instrument includes: a movement-estimating unit for estimating a movement condition of a drive mechanism based on a scanning vector command issued by a scanning vector commander to calculate an estimated operation state quantity; and a correction-calculating unit for correcting a detection value of a drive sensor in accordance with the estimated operation state quantity calculated by the movement-estimating unit. The movement-estimating unit includes: a nominal-model setting unit in which a nominal model representing signal transfer function of the scanning vector command from the issuance of the scanning vector command to a reflection on a movement position of the scanning probe is stored. The correction-calculating unit includes a correction-amount calculating unit that calculates a correction amount for correcting a measurement error generated on account of deformation during the drive of the drive mechanism based on the estimated operation state quantity; and a measurement data synthesizing unit that synthesizes the detection value of the drive sensor and a detection sensor and the correction amount calculated by the correction-amount calculating unit to acquire a measurement data.

5 Claims, 23 Drawing Sheets

SURFACE TEXTURE MEASURING INSTRUMENT

BACKGROUND OF THE INVENTION

1. Field of the Invention

The present invention relates to a surface texture measuring instrument.

Specifically, it relates to, for instance, a surface scanning measuring instrument that scans an object surface to measure a profile, surface roughness, waviness and the like of an object to be measured.

2. Description of Related Art

A surface scanning measuring instrument that scans an object surface to measure a three-dimensional profile of an object has been traditionally known.

FIG. 20 shows an arrangement of a measurement system 100 as an example of a surface scanning measuring instrument that utilizes a scanning probe 130.

The measurement system 100 includes: a coordinate measuring machine (CMM) 110 that moves a scanning probe 130; a console 150 for manually operating the CMM 110; a motion controller 160 for controlling the operation of the CMM 110; and a host computer 200 that operates the CMM 110 through the motion controller 160 and processes the measurement data obtained by the CMM 110 to calculate the dimension and profile of the object W.

The CMM 110 includes: a table 111; a drive mechanism 120 vertically provided on the table 111 to three-dimensionally move the scanning probe 130; and a drive sensor (not shown) for detecting the drive amount of the drive mechanism 120.

The drive mechanism 120 includes: two beam supports 121 extending in Zm-axis direction (substantially vertical direction) from both sides of the table 111, the beam supports being capable of slide movement in Ym-axis direction (i.e. along the sides of the table 111); a beam 122 supported on upper ends of the beam supports 121, the beam extending in Xm-axis direction; a column 123 provided on the beam 122 in a manner slidable along the Xm-axis direction and having a guide in the Zm-axis direction; and a spindle 124 slidable in the column 123 in the Zm-axis direction, the spindle holding the scanning probe 130 at the lower end thereof.

The drive sensor includes a Ym axis sensor that detects the movement of the beam supports 121 in the Ym-axis direction, an Xm axis sensor that detects the movement of the column 123 in the Xm-axis direction and a Zm axis sensor that detects the movement of the spindle 124 in the Zm-axis direction.

As shown in FIG. 21, the scanning probe 130 includes a stylus 131 including a contact piece (measurement piece) 132 at a distal end thereof and a holder 133 that holds a base end of the stylus 131 in a manner slidable in Xp, Yp and Zp directions within a predetermined limit.

The holder 133 includes a slide mechanism (not shown) that has an xp slider, yp slider and zp slider capable of movement in mutually orthogonal directions and a probe sensor (not shown) that detects the displacement of the slide mechanism in the respective axis directions and outputs the detected displacement.

The stylus 131 is supported by a slide mechanism in a manner capable of slide movement relative to the holder 133 within a predetermined limit.

Incidentally, such an arrangement of the scanning probe 130 is disclosed in, for instance, Document 1 (JP-A-05-256640).

In thus arranged instrument, scanning movement of the scanning probe 130 is conducted along the object surface S while the contact piece 132 is in contact with the object surface S with a reference retraction $\Delta r$.

At this time, the movement locus of the scanning probe 130 can be obtained based on the drive amount of the drive mechanism 120.

It should be noted that, though the movement locus of the scanning probe 130 represents a movement locus of the contact piece 132, the contact point of the contact piece 132 against the object surface S resides at a position being offset by a predetermined distance ($\Delta Q$) relative to the movement locus of the center of the contact piece 132.

Accordingly, after obtaining the position of the contact piece 132 by summing the position of the scanning probe 130 detected by the drive sensor and the displacement of the stylus 131 detected by the probe sensor, the position of the contact piece 132 is corrected for the predetermined offset value ($\Delta Q$) to calculate the position of the object surface S.

At this time, it should not be neglected that inertia force is applied on a component that is driven with acceleration when the object surface S is to be scanned by a surface scanning measuring instrument.

For instance, when the object W shows a circular or arc profile, centrifugal force is generated on account of circular motion, which causes deformation of the drive mechanism 120 (the spindle 124) as shown in FIG. 22.

When such deformation is induced by acceleration, the value detected by the drive sensor contains an error corresponding to the deformation.

For instance, when the centrifugal force is generated, the detection value of the drive sensor is biased toward an interior of a circle in accordance with outward deformation of the spindle 124, which manifest itself as, for instance, a radial displacement as shown in FIG. 23.

Incidentally, $L_1$ represents a diameter of a ring gauge and $L_2$ represents a measurement data in FIG. 23.

Such a problem is very prominently recognized when a high-speed scanning measurement has to be conducted with a large-size CMM 110 for measuring, for instance, a body of a vehicle.

In this regard, for instance, Document 2 (JP-A-07-324928) discloses the following method for correcting a measurement error caused by acceleration.

Specifically, a correction value representing deformation characteristics of a measurement slider is obtained in advance in the form of a function of the position and acceleration of the measurement slider.

The function of acceleration and deformation characteristics can be obtained by, for instance, measuring a diameter-known ring gauge at a variety of levels of acceleration and various positions within a measurement area.

When an object is measured, in addition to obtaining a detection data by sensors, a correction value is identified based on acceleration during the measurement to correct the detection data with the correction value.

A correct measurement value is thus obtained by canceling a measurement error generated by acceleration.

In order to obtain the acceleration during measurement, the Document 2 discloses: twice differentiating the measurement value of the position of the measurement slide (paragraph 0037, claim 12); and detecting the acceleration of the measurement slider by providing acceleration sensors (paragraph 0047, claim 13).

Though the acceleration is identified by twice differentiating the position of the measurement slider according to one of the methods of the Document 2, the resolution of the acceleration is deteriorated in reverse proportion to square of sampling frequency when the position detection value is differentiated twice.

For instance, when the sampling frequency is increased by ten times, the resolution of the acceleration to be detected is deteriorated to one hundredth. Consequently, the resolution of the correction amount is also deteriorated to one hundredth.

As discussed above, it is not practical to acquire the acceleration by differentiating the position twice and is insufficient to meet the demand for high-speed and highly accurate measurement.

Further, though the acceleration of the measurement slider is obtained by twice differentiating the position of the measurement slider, what should be considered during the actual measurement is acceleration and deformation on the distal end or probe of the spindle 124. Accordingly, accuracy of correction is limited in principle when the acceleration is obtained on the measurement slider.

Incidentally, though the Document 2 also shows acquisition of the acceleration of the measurement slider by providing acceleration sensors, no required performance and installation method are not mentioned therein, which proves that the method is practically inapplicable.

For instance, considering actual measurement of acceleration by an acceleration sensor, when a circle of 100 mm diameter is scanned at a scanning velocity of 10 mm/sec, approximately 50 μG centripetal acceleration is generated. However, it is difficult to provide an acceleration sensor capable of detecting 50 μG acceleration for each of movement axes (totaling three).

Furthermore, it is impossible to provide such acceleration sensors around the probe unit.

Accordingly, it is not possible for a traditional arrangement to accurately measure a deformation caused during scanning measurement and such deformation cannot be compensated.

Thus, the profile of the object cannot be accurately obtained during high-speed measurement, so that the measurement speed is limited to a level that causes no deformation in order to conduct an accurate measurement.

Especially, since there has been a growing demand for a large-size CMM for measuring a large-size object at a high speed, a solution for the above problem has been eagerly desired.

An object of the present invention is to provide a surface texture measuring instrument capable of overcoming the traditional problem and conducting a high-speed and high-accuracy scanning measurement.

SUMMARY OF THE INVENTION

A surface texture measuring instrument according to an aspect of the invention includes: a scanning probe including a measurement piece that is brought near to or into contact with an object surface and a detection sensor that detects a relative position between the measurement piece and the object surface, the relative position between the measurement piece and the object surface being kept at a preset reference position during a scanning process; a scanning vector commander that commands a scanning vector indicating a subsequent moving position of the scanning probe along the object surface; a drive mechanism including a drive shaft that holds and three-dimensionally moves the scanning probe, the drive mechanism moving the scanning probe in accordance with the scanning vector command; a drive sensor that detects a drive amount of the drive mechanism; a movement-estimating unit that estimates a movement condition of the drive mechanism based on the scanning vector command issued by the scanning vector commander to calculate an estimated operation state quantity; and a correction-calculating unit that corrects a detection value of the drive sensor in accordance with the estimated operation state quantity calculated by the movement-estimating unit, the movement-estimating unit including: a nominal-model setting unit in which a nominal model representing signal transfer function of the scanning vector command from when the scanning vector commander issues the scanning vector command until the scanning vector command is reflected on a movement position of the scanning probe is stored, the correction-calculating unit including: a correction-amount calculating unit that calculates a correction amount for correcting a measurement error caused on account of deformation of the drive mechanism while the drive mechanism is driven based on the estimated operation state quantity; and a measurement data synthesizing unit that synthesizes detection values of the drive sensor and the detection sensor and the correction amount calculated by the correction-amount calculating unit to acquire a measurement data.

In the above arrangement, the scanning vector command for moving the scanning probe along the object surface is issued from the scanning vector commander.

Then, the scanning probe is scanningly moved along the object surface by a drive mechanism in accordance with the scanning vector command.

The drive sensor detects the drive amount of the drive mechanism when the scanning probe scans the workpiece surface. Simultaneously, the relative position between the measurement piece and the object surface is detected by the detection sensor.

During the scanning movement, acceleration is generated and is applied as a force on the drive mechanism, which may be contained in the measurement error.

Accordingly, simultaneously with the scanning measurement by the scanning probe, correcting process for compensating the error on account of the deformation is conducted.

Specifically, the scanning vector command from the scanning vector commander is also input to the movement-estimating unit.

The movement condition when the drive mechanism is moved in accordance with the scanning vector command is estimated by the movement-estimating unit based on the nominal model (signal transfer function) and is calculated as the estimated operation state quantity.

The estimated operation state quantity is output to the correction-amount calculating unit. Then, the correction-amount calculating unit calculates the correction amount for correcting the measurement error based on the estimated operation state quantity.

In other words, the correction amount for correcting the measurement error in accordance with the deformation caused during the movement is calculated.

The calculated correction amount is synthesized with the detection values by the drive sensor and the detection sensor to be output as the measurement data.

According to the above arrangement, since the movement-estimating unit includes the nominal-model setting unit, the operating condition of the currently-driven drive mechanism can be calculated by the calculated estimated operation state quantity based on the nominal model.

Since the correction amount is determined by the correction-amount calculating unit based on the estimated operation state quantity, the correction amount for correcting the deformation generated on the currently-driven drive mechanism can be accurately calculated.

Traditionally, in order to determine the drive condition of a drive mechanism for correcting the measurement error, the drive condition is calculated based on the detection value of the drive sensor.

However, the detection value of the drive sensor contains the deformation of the drive mechanism caused when the drive mechanism is driven and is therefore not accurate. Accordingly, accurate correction cannot be expected by calculating a correction amount based on the value containing such an error.

Further, when the operating condition is calculated based on the detection value of the drive sensor, large discretization error is resulted if acceleration is to be calculated based on the detection value of the position, which is not practicable.

For instance, when the sampling pitch for detecting the position by the drive sensor is shortened to one tenth, the resolution of the acceleration (operation state quantity) is degraded to one hundredth.

Alternatively, acceleration sensors may be provided for acquiring the acceleration as the operation state quantity. However, provision of such acceleration sensors respectively in Xm, Ym and Zm directions is difficult and detection capability of the acceleration sensors is limited.

In contrast, since the nominal model is set in the nominal-model setting unit in the present invention, the operating condition of the drive mechanism can be determined by calculation without relying on actually measured data.

Accordingly, the operating condition can be accurately acquired even with a short cycle.

As a result, the correcting process can be conducted with a high resolution.

Further, when the operating condition is estimated without relying on actually measured data, the drive position and drive acceleration of the drive mechanism may be estimated assuming that, for instance, the drive mechanism is moved in accordance with the scanning vector command without time lag (i.e. when a position command is issued, the scanning probe is located at the commanded position simultaneously with the issuance of the command).

However, since the above assumption simply neglects the presence of signal transfer function of the drive mechanism such as delay in accordance a time constant, accurate correction cannot be conducted by the above estimation.

Further, since acceleration is fluctuated at the start of the operation and during an operation depicting a curve, simple assumption does not apply.

In this regard, since the nominal model representing the signal transfer function is set in the present invention and the operating condition of the drive mechanism is estimated using the nominal model, the operating condition such as the actual position and acceleration of the drive mechanism can be accurately determined in accordance with the actual situation.

Accurate correction can be achieved by the correction amount calculated based on thus determined operating condition.

In the above aspect of the invention, the movement-estimating unit preferably includes: a position-estimating unit that calculates the position of the scanning probe as an estimated position using the scanning vector command from the scanning vector commander and the nominal model stored in the nominal-model setting unit; and a second-order differentiating unit that conducts a second-order differentiation on the estimated position of the scanning probe calculated by the position-estimating unit to calculate acceleration as the estimated operation state quantity.

In the above arrangement, the scanning vector command from the scanning vector commander is input to the position-estimating unit.

Then, the position command C based on the scanning vector command and the preset nominal model $G_N$ are multiplied at the position-estimating unit to calculate the estimated position E of the scanning probe.

The calculated estimated position E of the scanning probe is output to the second-order differentiating unit.

Then, the acceleration (estimated operation state quantity) is calculated based on the estimated position of the scanning probe at the second-order differentiating unit.

The acceleration is output to the correction-amount calculating unit, at which the correction amount for compensating the measurement error in accordance with the deformation of the drive mechanism caused by the drive operation is calculated.

The calculated correction amount is synthesized with the detection values by the drive sensor and the detection sensor to be output as the measurement data.

According to the above arrangement, acceleration caused on the scanning probe can be acquired as the estimated operation state quantity.

When acceleration is calculated based on actual position data, the resolution of acceleration is degraded as the sampling pitch is shortened. However, since the acceleration is calculated by conducting a second-order differentiation on the estimated position calculated using the nominal model, the acceleration is not degraded in accordance with the sampling pitch.

Accordingly, acceleration can be calculated with a short cycle and the correction amount can be minutely calculated in accordance with thus derived acceleration.

Consequently, the position data acquired in a short cycle can be accurately corrected based on the operating condition, thus acquiring accurate texture data on a short pitch.

In the above aspect of the invention, the nominal-model setting unit preferably includes: a drive mechanism nominal-model setting unit in which the nominal model of the drive mechanism is stored; and a scanning probe nominal-model setting unit in which the nominal model of the scanning probe is stored.

In the above arrangement, the nominal model $G_N$ of the entirety of the surface texture measuring instrument is represented as a product of the nominal model $G_1(s)$ of the drive mechanism and the nominal model $G_2(s)$ of the scanning probe.

The scanning vector command from the scanning vector commander and the nominal model $G_N$ of the entirety of the surface texture measuring instrument are multiplied to calculate the estimated position of the scanning probe.

According to the above arrangement, the drive mechanism nominal-model setting unit and the scanning probe nominal-model setting unit are independently provided, the nominal model of the drive mechanism and the nominal model of the scanning probe can be separately set.

Accordingly, for instance, the nominal models of the scanning probe can be provided for each of the types of the scanning probes in preparation for replacement of the scanning probe, so that a nominal model corresponding to the currently-attached scanning probe can be selected.

As a result, the scanning probe can be immediately replaced when the scanning probe is damaged or other scanning probe is selected in accordance with the object to be measured, so that measurement efficiency can be improved.

In the above aspect of the invention, it is preferable that an arc is included on a part of the object surface, the scanning vector commander issues the scanning vector command for scanning the arc, and the movement-estimating unit includes a frequency-estimating unit that calculates a rotation frequency as the estimated operation state quantity for scanning the arc based on the acceleration calculated by the second-order differentiating unit.

In the above arrangement, when an arc portion is included in a part of the object surface, the scanning vector command for scanning the arc portion is issued from the scanning vector commander to conduct the scanning measurement of the arc portion.

The scanning vector command is also input to the movement-estimating unit. At the movement-estimating unit, position estimation using the nominal model and calculation of acceleration based on second-order differentiation of the estimated position is conducted.

Further, the frequency of the rotary movement at that time is calculated from the acceleration by the frequency-estimating unit.

For instance, the frequency of the rotary movement is calculated from the acceleration according to the following formula.

When a rotation radius of the rotary scanning measurement according to the scanning vector command is represented by Rs and estimated acceleration of the scanning probe calculated by the second-order differentiating unit is represented as $A(a_x, a_y, a_z)$, the frequency-estimating unit calculates the rotation frequency f according to the following formula:

$$f = \sqrt{\frac{\sqrt{a_x^2 + a_y^2 + a_z^2}}{(2\pi)^2 \cdot Rs}}$$

Thus calculated data of the rotation frequency f is output to the correction-calculating unit as the estimated operation state quantity.

Then, the correction amount for correcting the measurement error caused on account of the deformation of the drive mechanism is calculated by the correction-amount calculating unit based on the rotation frequency f.

According to the above arrangement, since the rotation frequency f in measuring a circle based on the estimated acceleration calculated by the second-order differentiating unit is calculated by the frequency-estimating unit, the rotation frequency f that varies during the scanning measurement of the arc portion can be accurately acquired.

For instance, when a command for scanning a circle at a rotary speed of the rotation frequency f is issued by the scanning vector commander, since the commanded speed has not been reached immediately after starting the operation before the speed is stabilized, commanded rotation frequency f cannot be obtained.

Accordingly, when the correction amount is calculated on the basis of the commanded rotation frequency f, accurate correction cannot be conducted.

In this regard, the rotation frequency f based on the estimated acceleration is calculated each time after estimating the acceleration by the second-order differentiation in the above aspect of the invention without directly using the rotation frequency f of the commanded value as the basis of the correcting calculation.

Consequently, since the rotation frequency f that varies during the scanning movement of the arc portion can be accurately determined, accurate correction can be conducted even when the centrifugal force during the rotary movement is corrected by the correcting calculation based on the rotation frequency f.

Further since it requires some time before reaching the commanded frequency during the scanning measurement of the arc portion, when the correction process is based on the commanded rotation frequency, it is possible to acquire an accurate measurement data by using only the data acquired after the scanning velocity (i.e. the rotation frequency) becomes constant is corrected to obtain the measurement data without using the data acquired while being accelerated.

However, the time before the scanning velocity (i.e. the rotation frequency) is stabilized is unused in this method, which extremely lowers the operation efficiency of the measurement.

In contrast, since the rotary frequency is calculated for each of the estimated acceleration and the correction amount can be calculated based on the calculated rotation frequency, all of the acquired data can be corrected to acquire the measurement data without waiting for the scanning speed (i.e. the rotation frequency) to reach the constant value.

Consequently, the measurement operation efficiency can be improved.

In the above aspect of the invention, the surface texture measuring instrument preferably include: an estimation-judging unit for judging an accuracy of an estimation of the movement-estimating unit, the estimation-judging unit including: an actual operation state quantity calculating unit for calculating an actual operation state quantity based on a measurement value detected by the drive sensor; a difference-calculating unit for calculating a difference between the estimated operation state quantity calculated by the movement-estimating unit and the actual operation state quantity; and a judging unit that compares the difference with a predetermined threshold to judge the accuracy of the estimation of the movement-estimating unit.

According to the above arrangement, since the estimation-judging unit is provided, the accuracy of acceleration estimation by the movement-estimating unit can be judged.

Further, since the continuation or termination of the correction calculation can be determined based on the judgment, erroneous measurement result output on account of erroneously correcting the measurement data can be prevented.

DETAILED DESCRIPTION OF PREFERRED EMBODIMENT(S)

Figure 1:
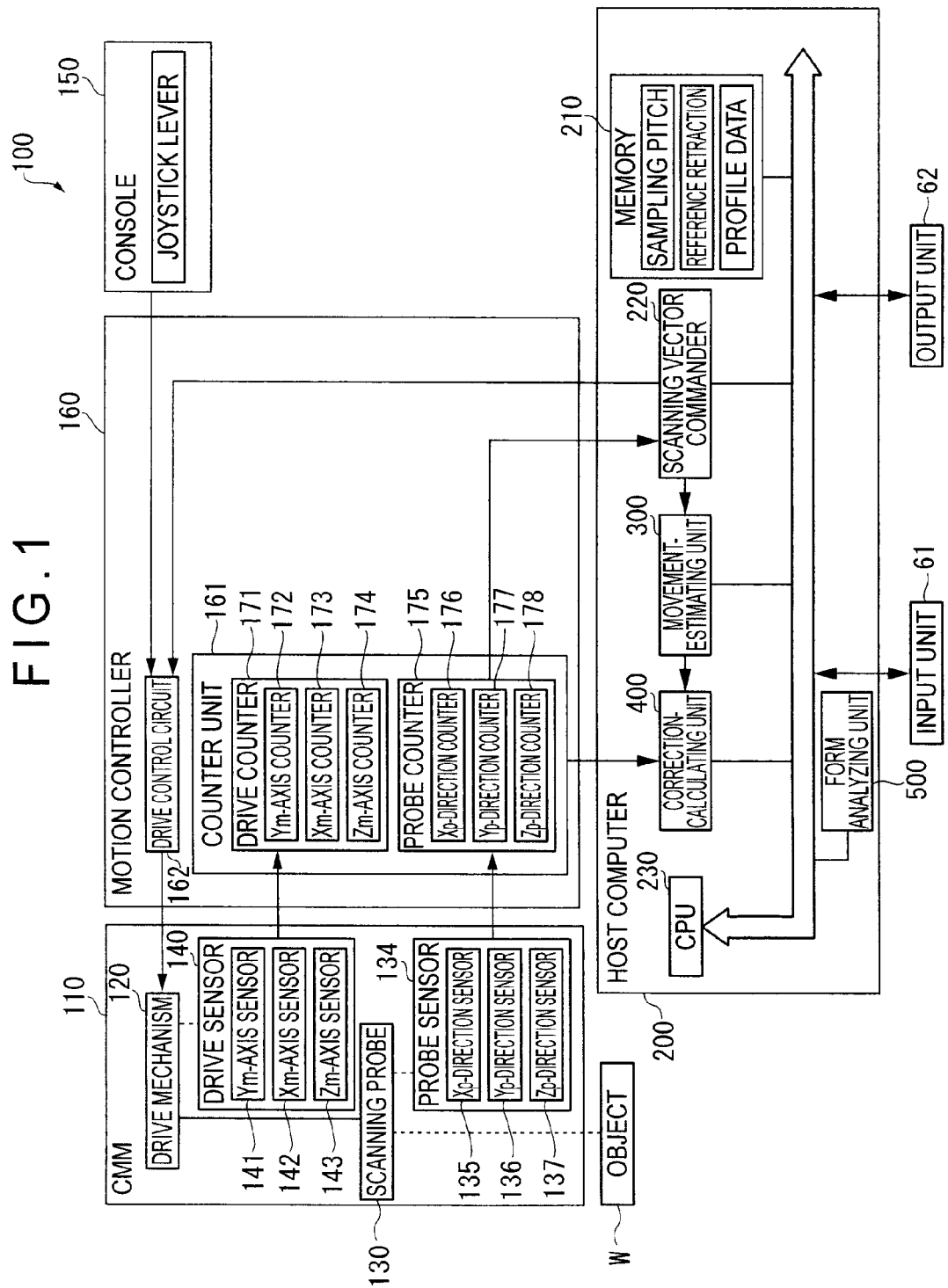
FIG. 1 is a functional block diagram showing a measurement system according to a first embodiment of the invention.

An embodiment of the present invention will be described below with reference to the attached drawings and reference numerals annexed to respective elements in the drawings.

First Embodiment

A surface texture measuring instrument according to a first embodiment of the invention will be described below.

Figure 20:
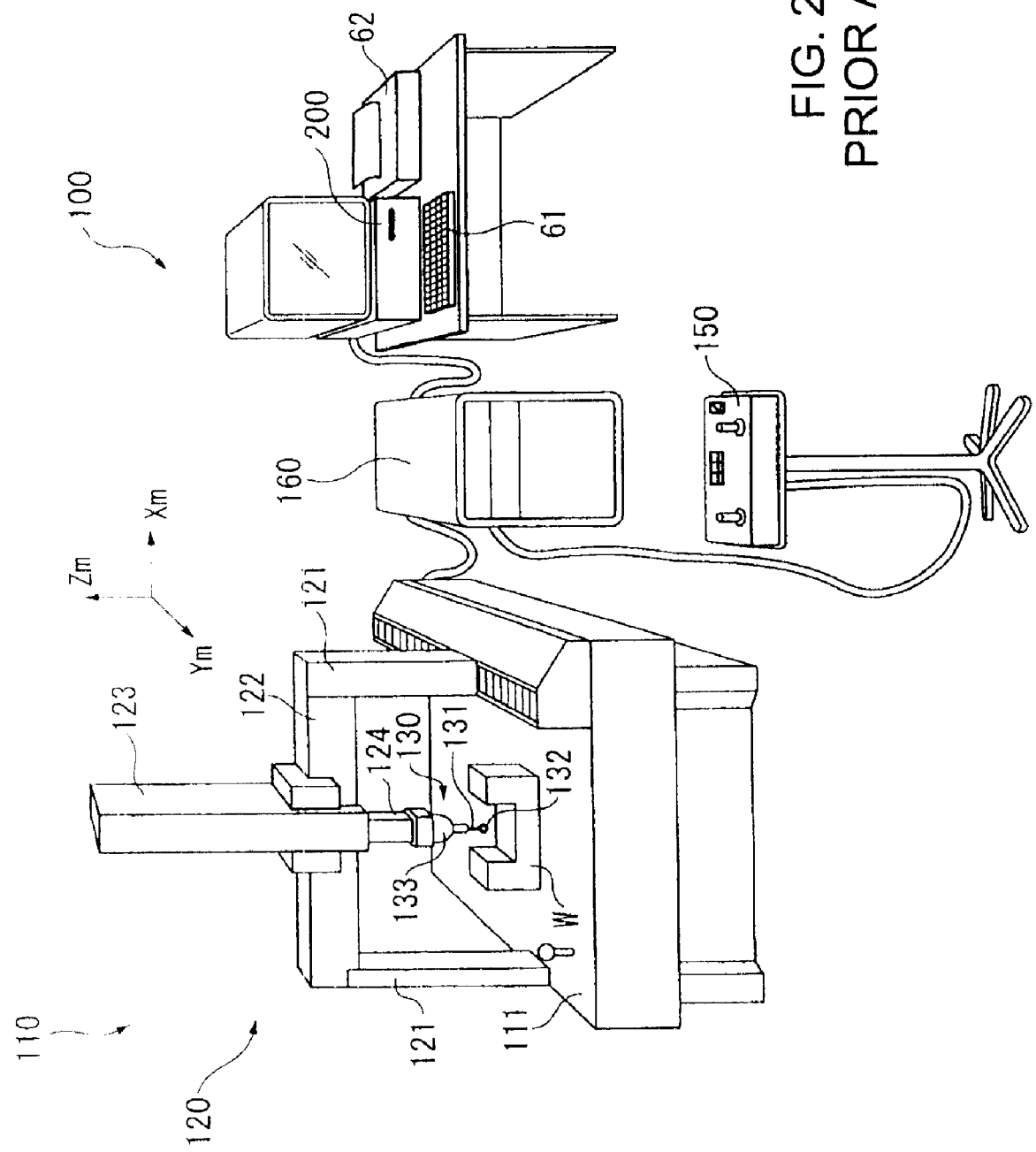
FIG. 20 shows an arrangement of a measuring system in the form of a surface scanning measuring instrument that utilizes a scanning probe.

FIG. 20 shows a surface scanning measuring instrument according to the first embodiment in the form of a measuring system 100 that utilizes a scanning probe 130.

FIG. 1 shows a functional block diagram showing the measuring system 100.

The measuring system 100 is constructed in the same manner as what has been described in the Background section, which includes a CMM 110, a console 150 for manually controlling the operation of the CMM 110, a motion controller 160 for executing drive control of the CMM 110, a host computer 200 that sends a predetermined command to the motion controller 160 and conducts calculation processing such as profile analysis of an object W, an input unit 61 through which a measurement condition and the like are input, and an output unit 62 that outputs a measurement result.

The CMM 110 includes (see FIG. 20): a table 111; a drive mechanism 120 vertically provided on the table 111 to three-dimensionally move the scanning probe 130; and a drive sensor 140 for detecting the drive amount of the drive mechanism 120.

The drive mechanism 120 includes: two beam supports 121 extending in Zm-axis direction (substantially vertical direction) from both sides of the table 111, the beam supports being capable of slide movement in the Ym-axis direction (i.e. along the sides of the table 111); a beam 122 supported on an upper end of the beam supports 121, the beam extending in the Xm-axis direction; a column 123 provided on the beam 122 in a manner slidable along the Xm-axis direction and having a guide in the Zm-axis direction; and a spindle 124 slidable in the column 123 in the Zm-axis direction, the spindle holding the scanning probe 130 at the lower end thereof.

The drive sensor includes a Ym-axis sensor 141 that detects the movement of the beam supports 121 in the Ym-axis direction, an Xm-axis sensor 142 that detects the movement of the column 123 in the Xm-axis direction and a Zm-axis sensor 143 that detects the movement of the spindle 124 in the Zm-axis direction.

Figure 21:
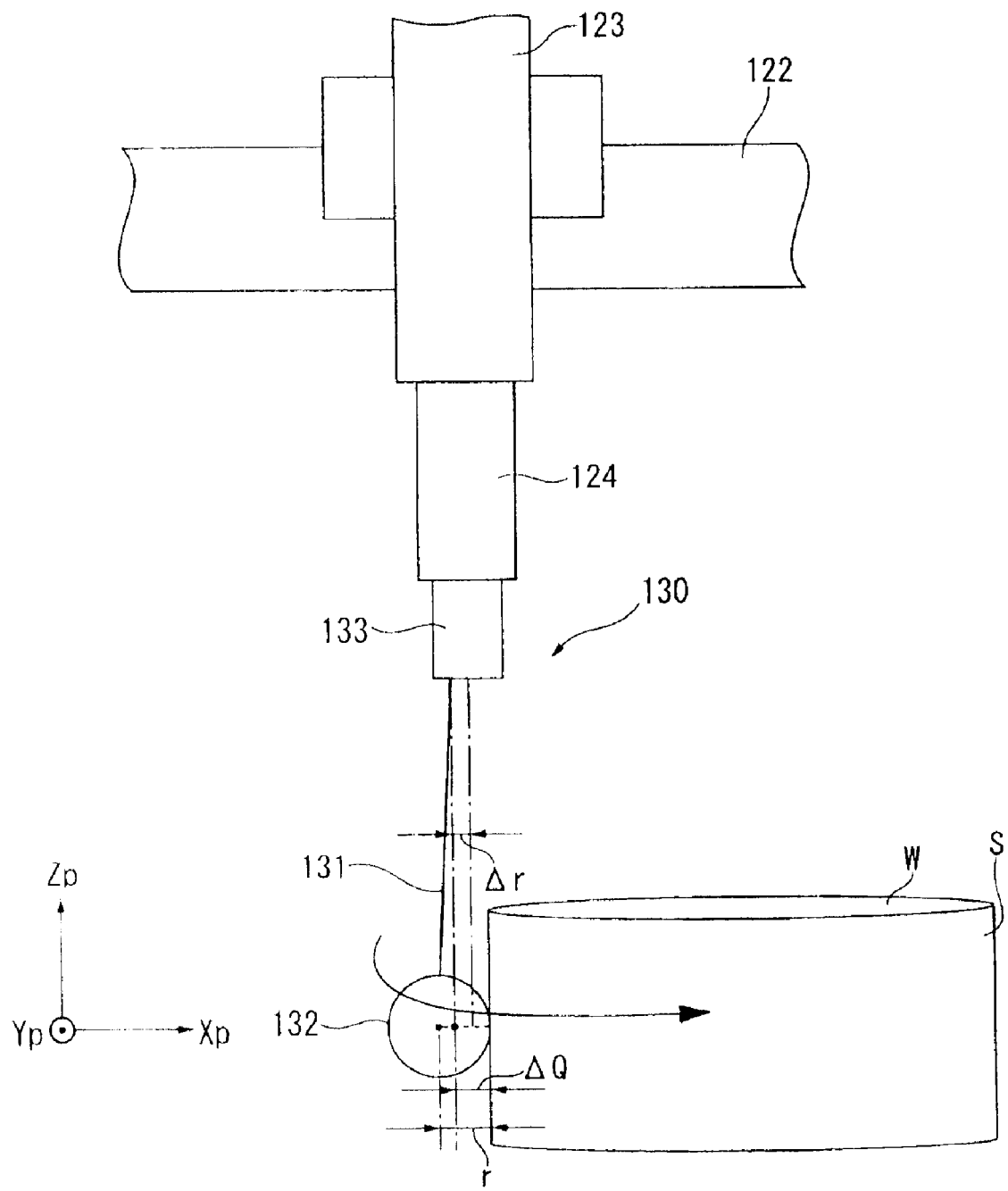
FIG. 21 is an illustration showing an arrangement of the scanning probe and a measurement process of an object surface using the scanning probe.

The scanning probe 130 (see FIG. 21) includes a stylus 131 including a contact point (measurement piece) 132 at a distal end thereof and a holder 133 that holds a base end of the stylus 131 in a manner slidable in Xp, Yp and Zp directions within a predetermined limit.

The holder 133 includes a slide mechanism (not shown) that has an xp slider, yp slider and zp slider capable of movement in mutually orthogonal directions and a probe sensor 134 that detects the displacement of the slide mechanism in the respective axis directions and outputs the detected displacement.

The probe sensor 134 includes an Xp direction sensor 135 that detects the movement of the stylus 131 in the Xp direction, a Yp direction sensor 136 that detects the movement of the stylus 131 in the Yp direction and a Zp direction sensor 137 that detects the movement of the stylus 131 in the Zp direction.

The motion controller 160 includes a counter unit 161 that counts a detection signal from the drive sensor 140 and the probe sensor 134, and a drive control circuit 162 that controllably drives the drive mechanism 120 in accordance with the command from the host computer 200 and the console 150.

The counter unit 161 includes a drive counter 171 that counts the detection signal (pulse signal) output from the drive sensor 140 to measure the drive amount of the drive mechanism 120 and a probe counter 175 that counts the detection signal (pulse signal) output by the probe sensor 134 to measure the slide amount of the stylus 131 as a retraction amount.

The drive counter 171 includes a Ym-axis counter 172 that counts the detection signal output by the Ym-axis sensor 141, an Xm-axis counter 173 that counts the detection signal output by the Xm-axis sensor 142 and a Zm-axis counter 174 that counts the detection signal output by the Zm-axis sensor 143.

The probe counter 175 includes an Xp direction counter 176 that counts the detection signal output by the Xp direction sensor 135, a Yp direction counter 177 that counts the detection signal output by the Yp direction sensor 136 and a Zp direction counter 178 that counts the detection signal output by the Zp direction sensor 137. The count value (Xm, Ym, Zm) of the drive counter 171 and the count value (Xp, Yp, Zp) of the probe counter 175 are respectively output to the host computer 200.

The host computer 200 includes: a memory (storage) 210 that stores the measurement condition and the like input by the input unit 61; a scanning vector commander 220 that commands a scanning vector having a moving direction and a moving speed for scanning the object surface; a movement-estimating unit 300 that estimates the movement of the drive mechanism 120 in accordance with the command from the scanning vector commander 220 to calculate the acceleration generated on the scanning probe 130; a correction-calculating unit 400 that calculates a correction amount based on the movement-estimation of the movement-estimating unit 300 to correct the measurement value; a form analyzing unit 500 that analyzes the profile of the object W; a central processing unit (CPU) 230 that includes an arithmetic processing device and a storage (ROM, RAM) to execute a predetermined program to process the data; and a bus that connects the respective units.

The memory 210 stores the measurement condition and the like input by the input unit 61. For instance, an interval (sampling pitch) for sampling the drive amount of the drive mechanism 120 during the scanning operation, an amount for the contact piece 132 to be pressed toward the object W (reference retraction $\Delta r$), speed for the scanning operation, profile data based on design data of the object W and the like are stored therein.

The scanning vector commander 220 generates a scanning vector command for scanning the object W based on, for instance, the profile data set on the memory 210.

The scanning vector commander 220 generates a scanning vector command in a pressing direction that sets the pressing amount within a predetermined range (reference position range) at the reference retraction $\Delta r$ based on the output of the probe counter 175.

The scanning vector command generated by the scanning vector commander 220 is output to the drive control circuit 162.

Figure 2:
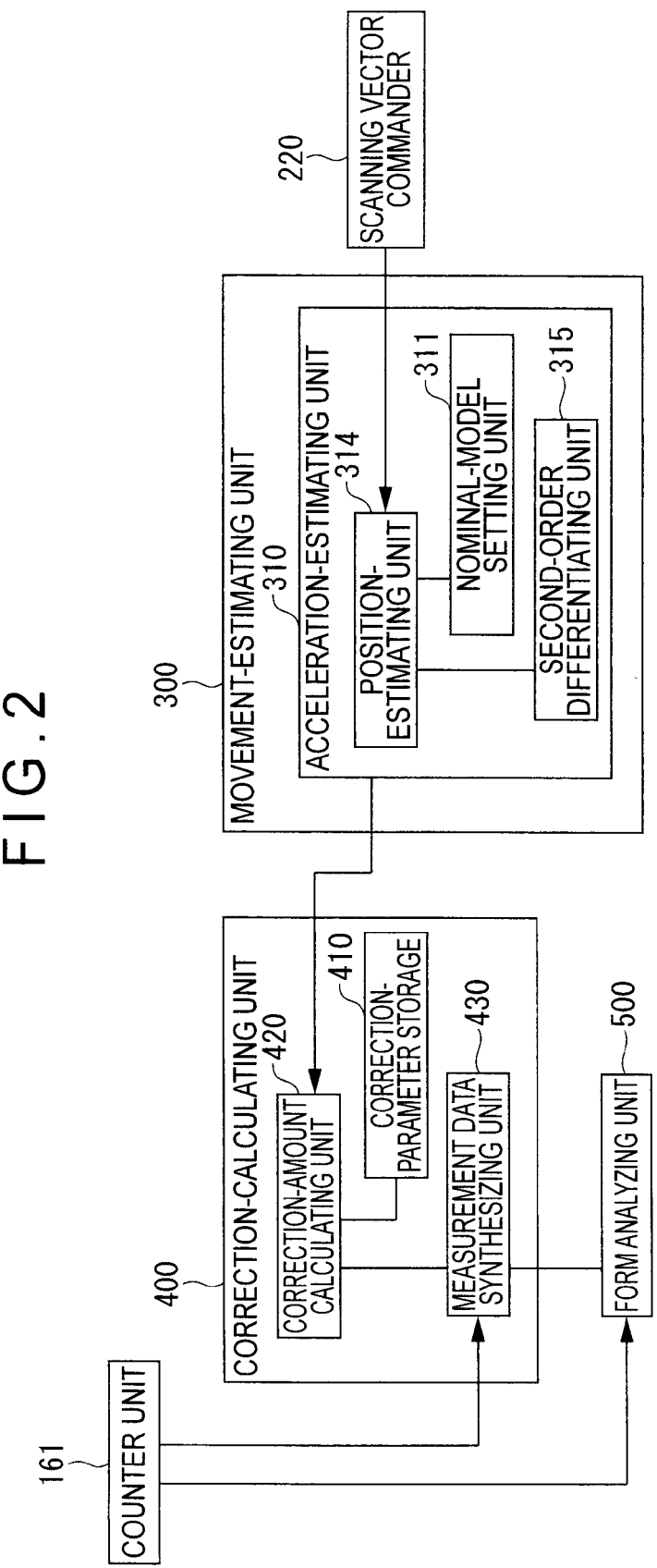
FIG. 2 is a block diagram showing an arrangement of a movement-estimating unit and correction-calculating unit of the first embodiment.

FIG. 2 is an illustration showing an arrangement of the movement-estimating unit 300 and the correction-calculating unit 400.

The movement-estimating unit 300 is provided by an acceleration-estimating unit 310 that estimates the acceleration of the scanning probe 130.

The acceleration-estimating unit 310 includes: a nominal-model setting unit 311 in which a nominal model in the form of a transmitting function (signal transfer function) from the issuance of the scanning vector command by the scanning vector commander 220 to the position detection of the drive sensor 140; a position-estimating unit 314 that estimates the position of the scanning probe 130 based on the scanning vector command and the nominal model; and a second-order differentiating unit 315 that calculates the acceleration of the scanning probe 130 by a second-order differentiation based on the data of the estimated position calculated by the position-estimating unit 314.

Figure 3:
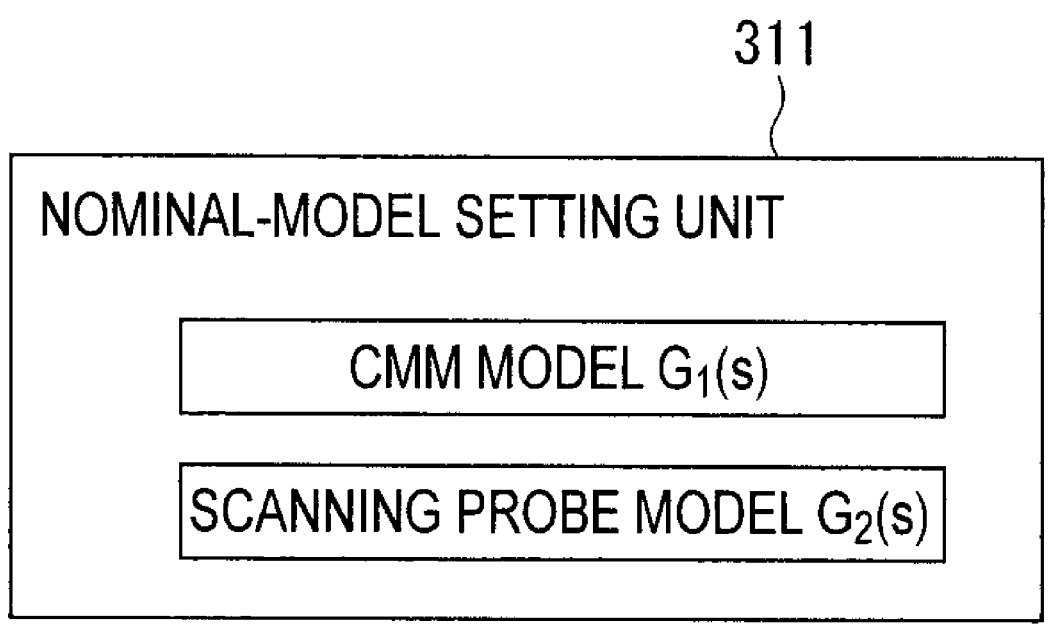
FIG. 3 is an illustration showing an arrangement of a nominal-model setting unit.

FIG. 3 is an illustration showing an arrangement of the nominal-model setting unit 311.

The nominal model stored in the nominal-model setting unit 311 represents a frequency transmitting function (signal transfer function) from the issuance of the scanning vector command until the CMM 110 is driven to the commanded position.

As shown in FIG. 3, the nominal-model setting unit 311 stores a nominal model $G_1(s)$ of the CMM 110 (nominal model of the drive mechanism 120) and a nominal model $G_2(s)$ of the scanning probe 130.

The nominal model of the scanning probe 130 includes a plurality of nominal models for each of the types of the scanning probes 130, so that a nominal model corresponding to the currently-attached scanning probe 130 can be selected.

The frequency transmitting function from the issuance of the scanning vector command to the position of the scanning probe 130 is represented as $G_N(=G_1(s) \times G_2(s))$, i.e. a product of the nominal model $G_1(s)$ of the CMM 110 and the nominal model $G_2(s)$ of the scanning probe 130.

Incidentally, the scanning vector commanding, the drive of the CMM 110, the position detection by the drive sensor 140 and the like are effected respectively for Xm-axis, Ym-axis and Zm-axis directions. However, since the position control system (feedback control system that detects the position based on the scanning vector command) is adjusted so that all of time constants T for driving in Xm, Ym and Zm-axis directions are equalized, the same nominal model $G_N$ is used in Xm, Ym and Zm-axis directions.

The nominal model $G_N$ is acquired based on design data, through experiments and the like.

For instance, when the nominal model $G_N$ represents a first order lag system, the nominal model $G_N$ can be represented by the following formula, where K represents a gain and s represents a Laplace operator.

$$G_N = K \cdot \frac{1}{1 + T \cdot s}$$

The position-estimating unit 314 estimates the position of the scanning probe 130 based on the position command C ($c_x$, $c_y$, $c_z$) of the scanning vector command and the nominal model $G_N$.

The scanning vector command generated by the scanning vector commander 220 are input to the position-estimating unit 314 for every moment.

The estimated position E ($e_x$, $e_y$, $e_z$) of the scanning probe 130 is calculated based on the position command C ($c_x$, $c_y$, $c_z$) and the nominal model $G_N$.

In other words, the estimated position E of the scanning probe 130 is represented by a product of the nominal model $G_N$ and the position command C.

$$E = G_N \cdot C$$

The components of the estimated position in the Xm-axis direction, Ym-axis direction and Zm-axis direction are represented as follows:

$$e_x = G_N \cdot c_x$$

$$e_y = G_N \cdot c_y$$

$$e_z = G_N \cdot c_z$$

The second-order differentiating unit 315 obtains acceleration A ($a_x$, $a_y$, $a_z$) caused on the scanning probe 130 as estimated operation state quantity by conducting second-order differentiation on an estimated position E ($e_x$, $e_y$, $e_z$) of the scanning probe 130 calculated by the position estimating unit 314.

$$A(t) = \frac{d^2 E(t)}{dt^2}$$

-continued $$a_x = \ddot{e}_x$$

$$a_y = \ddot{e}_y$$

$$a_z = \ddot{e}_z$$

The correction-calculating unit 400 includes: a correction-parameter storage 410 in which a correction parameter representing a relationship between acceleration caused on the scanning probe 130 and the deformation of the CMM 11; a correction-amount calculating unit 420 that calculates a correction amount D for correcting the detection value by the drive sensor 140 and the probe sensor 134 based on the acceleration caused on the scanning probe 130; and a measurement data synthesizing unit 430 that synthesizes the calculated correction amount D and the detection value of the drive sensor 140 and the probe sensor 134 to acquire the position of the object surface.

Correction parameters P are stored in the correction parameter storage 410.

The correction parameters P associate the deformation caused on the CMM 110 (more specifically, the deformation caused on the column 123 and the spindle 124) when the acceleration A is applied on the scanning probe 130.

The correction parameters P ($p_x$, $p_y$, $p_z$) are defined for each of the axis directions (i.e. Xm, Ym and Zm-axis directions).

Incidentally, in order to determine the correction parameters P, it is assumed in the below-described modifications 1 to 3 that the probe causes a rotary movement as an example. However, the parameters representing the relationship between the acceleration A and the deformation may not be determined in the manner exemplified in the modifications 1 to 3 but may be determined based on design value or experimental value.

The correction-amount calculating unit 420 calculates the correction amount D ($d_x$, $d_y$, $d_z$) for respective axis directions based on the acceleration A and the correction parameters P.

The acceleration A calculated by the movement-estimating unit 300 is input into the correction-amount calculating unit 420.

The correction-amount calculating unit 420 calculates the correction amount D using the correction parameters P stored in the correction-parameter storage 410, as follows:

$$D = P \cdot A$$

$$d_x = p_x \cdot a_x$$

$$d_y = p_y \cdot a_y$$

$$d_z = p_z \cdot a_z$$

The measurement data synthesizing unit 430 synthesizes the drive amount of the drive mechanism 120 measured by the drive counter 171 and the correction amount D calculated by the correction-amount calculating unit 420 to acquire the position data of the scanning probe 130.

Specifically, the coordinate value ($x_s$, $y_s$, $z_s$) of the object surface S is determined at a position considering the predetermined reference retraction Δr from the position of the contact piece 132 obtained by synthesizing the detection value ($X_m$, $Y_m$, $Z_m$) by the drive sensor 140, the correction amount D ($d_x$, $d_y$, $d_z$) calculated by the correction-amount calculating unit 420 and the detection value ($x_p$, $y_p$, $z_p$) of the probe sensor 134

The calculated measurement data of the object surface is output to the form analyzing unit 500.

The form analyzing unit 500 synthesizes the measurement data to calculate the locus of the contact piece 132 and the texture data of the object surface.

Further, the form analyzing unit 500 also conducts texture analysis where, for instance, the calculated texture data of the object is compared with a design data to calculate error and deformation.

An operation in thus arranged first embodiment will be described below.

Initially, measurement condition is input prior to measurement.

The measurement condition includes a sampling pitch, the reference retraction and profile data of the object.

Further, the nominal model $G_1(s)$ of the CMM 110 and the nominal model $G_2(s)$ of the scanning probe 130 are input into the nominal-model setting unit 311.

The nominal model of the scanning probe 130 is selected from among a plurality of previously stored nominal models that suits the currently used scanning probe 130.

When the measurement process is started under this condition, the scanning vector command generated in the scanning vector commander 220 is initially output to the drive control circuit 162.

Then, the control signal is output from the drive control circuit 162 to the drive mechanism 120 to drive the drive mechanism 120.

The drive mechanism 120 moves the scanning probe 130 along the object surface while the scanning probe 130 is pressed toward the object by the reference retraction Δr.

Figure 22:
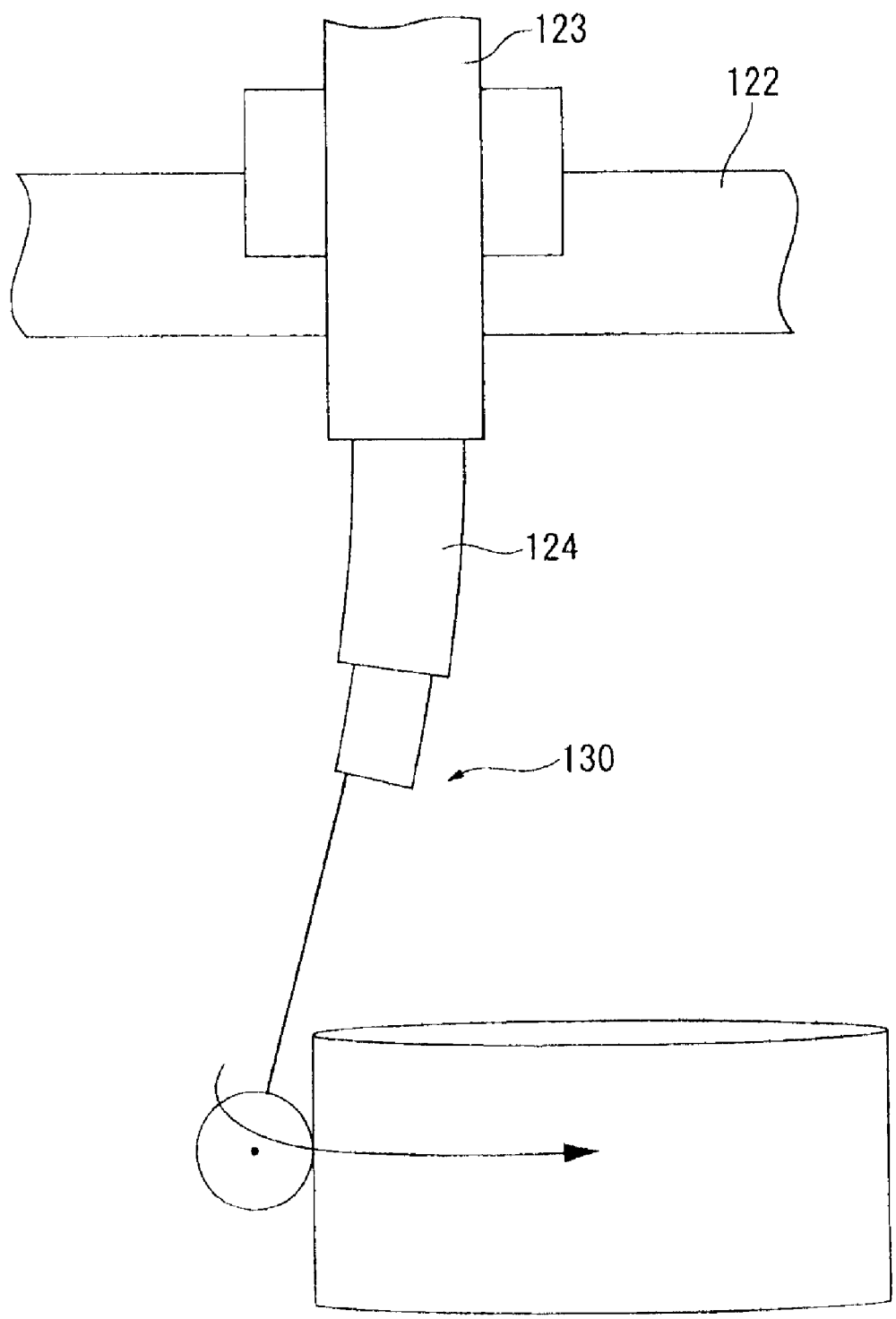
FIG. 22 is an illustration showing an error caused on account of deformation during scanning measurement.

During the scanning movement, acceleration is applied to cause deformation on the spindle 124 of the CMM 110 (see FIG. 22, for instance).

Further, the retraction is controlled during the scanning measurement at the reference retraction Δr based on the probe counter value (retraction of the stylus 131) output from the probe counter 175 to the scanning vector commander 220.

The drive sensor 140 detects the drive amount of the drive mechanism 120 when the scanning probe 130 scans the object surface. The displacement of the stylus 131 at this time is detected by the probe sensor 134.

The detection signal output by the drive sensor 140 is counted by the drive counter 171 and the detection signal output by the probe sensor 134 is counted by the probe counter 175.

Incidentally, the data counted by the counter unit 161 is acquired at the preset sampling pitch.

The data counted by the counter unit 161 (the drive counter 171 and the probe counter 175) is also output to the correction-calculating unit 400.

The scanning vector command from the scanning vector commander 220 is sent to the movement-estimating unit 300 and, simultaneously, to the drive control circuit 162.

The scanning vector command is input into the position-estimating unit 314 in the movement-estimating unit 300.

The position-estimating unit 314 calculates a current estimated position E(t) of the scanning probe 130 considering the frequency transmitting function according to the nominal model input in the nominal-model setting unit 311 and the position command of the scanning vector command.

Specifically, the estimated position E(t) ($e_x$, $e_y$, $e_z$) of the scanning probe 130 is calculated based on the position command C ($c_x$, $c_y$, $c_z$) and the nominal model $G_N$.

$$e_x = G_N \cdot c_x$$

$e_y = G_N \cdot c_y$ $e_z = G_N \cdot c_z$

The estimated position E(t) calculated by the position-estimating unit 314 is input into the second-order differentiating unit 315.

The second-order differentiating unit 315 conducts a second-order differentiation on the calculated estimated position E(t) to calculate the acceleration A ($a_x$, $a_y$, $a_z$) currently applied on the scanning probe 130.

$a_x = \ddot{e}_x$ $a_y = \ddot{e}_y$ $a_z = \ddot{e}_z$

The acceleration A calculated by the second-order differentiating unit 315 is output to the correction-amount calculating unit 420 of the correction-calculating unit 400.

The correction-amount calculating unit 420 calculates the correction amount D for correcting the deformation on account of the acceleration A based on the input acceleration A and the correction parameters P ($p_x$, $p_y$, $p_z$).

Specifically, when the acceleration A is applied on the scanning probe 130, the correction amount D ($d_x$, $d_y$, $d_z$) for correcting the detection value of the drive sensor 140 is calculated as follows:

$d_x = p_x \cdot a_x$ $d_y = p_y \cdot a_y$ $d_z = p_z \cdot a_z$

Thus calculated correction amount D is output to the measurement data synthesizing unit 430.

The measurement data synthesizing unit 430 synthesizes the detection value ($x_m$, $y_m$, $z_m$) of the drive sensor 140, the calculated correction amount D ($d_x$, $d_y$, $d_z$) and the detection value ($x_p$, $y_p$, $z_p$) of the probe sensor 134 to acquire the position of the contact piece 132.

Further, the surface of the object W is located at a position considering the predetermined reference retraction Δr relative to the position of the contact piece 132.

The surface data of the object W (measurement data) is sequentially sent to the form analyzing unit 500 to acquire the texture data of the object surface.

Then, the form analyzing unit 500 conducts texture analysis where, for instance, the calculated texture data of the object W is compared with a design data to calculate error, deformation and the like.

According to thus arranged first embodiment, following advantage can be obtained.

(1) The movement-estimating unit 300 is provided with the nominal-model setting unit 311. Accordingly, the acceleration can be accurately calculated as a movement condition of the currently-driven drive mechanism 120 by calculating the acceleration based on the nominal model.

Since the correction amount is determined by the correction-amount calculating unit 420 based on the estimated acceleration, the correction amount for correcting the deformation generated on the currently-driven drive mechanism 120 can be accurately calculated. Since the movement condition of the drive mechanism 120 can be acquired by the calculation based on the nominal model without relying on actual measurement data, high-resolution correction can be conducted.

Second Embodiment

Next, a surface scanning measuring instrument according to a second embodiment of the invention will be described below.

The basic arrangement of the second embodiment is the same as the first embodiment except that the deformation caused on account of centrifugal force during the rotary movement is corrected in the second embodiment.

Figure 4:
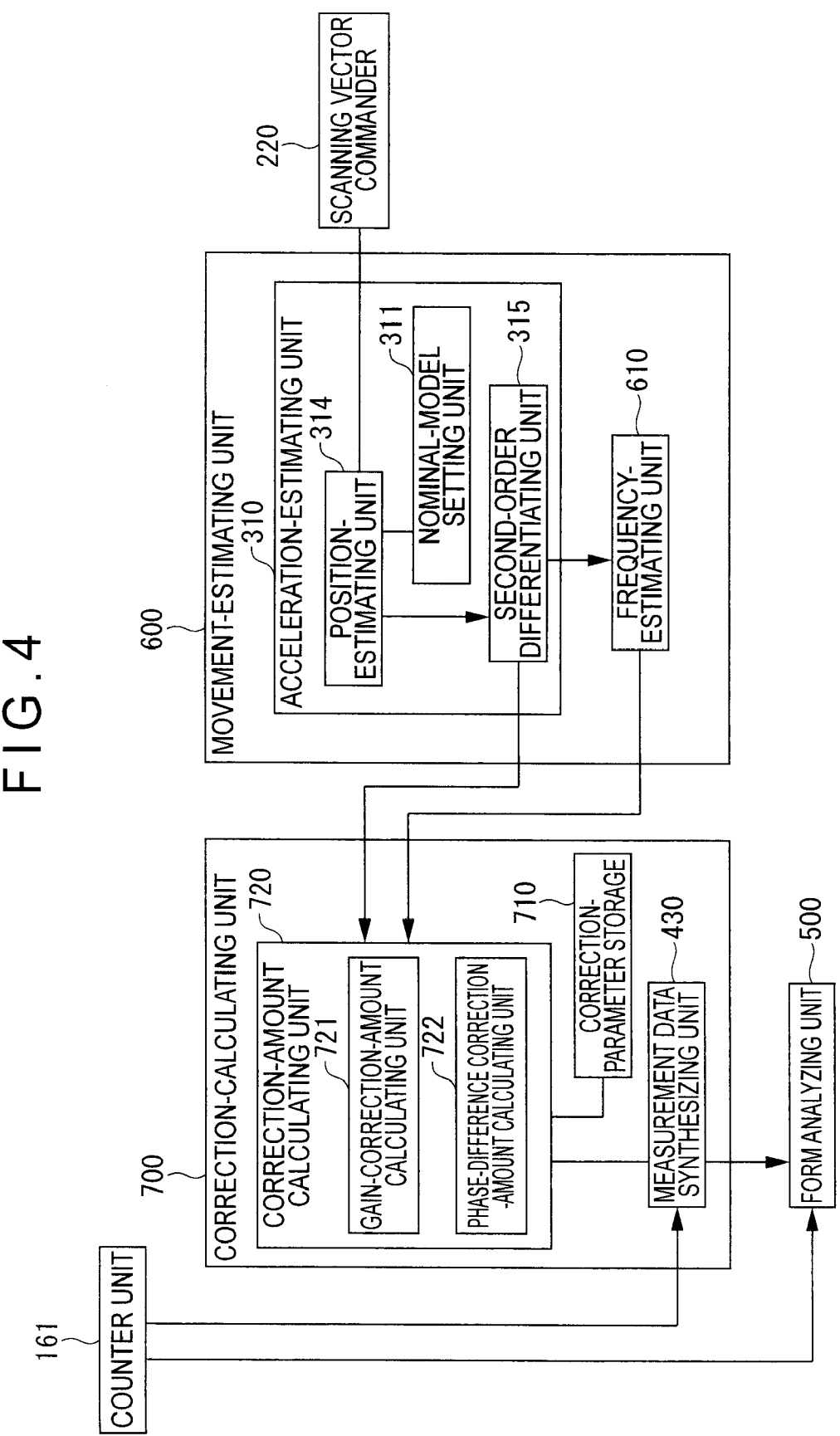
FIG. 4 is a block diagram showing an arrangement of a movement-estimating unit and correction-calculating unit according to a second embodiment of the invention.

FIG. 4 shows a movement-estimating unit 600 and a correction-calculating unit 700 according to the second embodiment.

The movement-estimating unit 600 includes the acceleration estimating unit 310 and a frequency-estimating unit 610.

The frequency-estimating unit 610 estimates the rotary frequency of the rotary movement of the scanning probe 130.

The acceleration A is calculated by the second-order differentiating unit 315. The acceleration A ($a_x$, $a_y$, $a_z$) calculated by the second-order differentiating unit 315 is input into the frequency-estimating unit 610.

When a rotation radius of the rotary scanning measurement according to the scanning vector command is represented by Rs and estimated acceleration of the scanning probe 130 calculated by the second-order differentiating unit 315 is represented as A ($a_x$, $a_y$, $a_z$), the frequency-estimating unit 610 calculates the rotation frequency f of the rotary movement according to the following formula:

$$f = \sqrt{\frac{\sqrt{a_x^2 + a_y^2 + a_z^2}}{(2\pi)^2 \cdot Rs}}$$

The derivation of the above formula can be explained as follows:

The relationship between the rotation frequency f and the angular velocity ω is represented by ω=2πf. When centripetal acceleration is represented as $a_n$, since $a_n = R_s \omega^2$, following deformation is possible.

$$f = \frac{\omega}{2\pi}$$

where $$a_n = Rs \cdot \omega^2$$

$$\omega = \sqrt{\frac{a_n}{Rs}}$$

$$= \sqrt{\frac{\sqrt{a_x^2 + a_y^2 + a_z^2}}{Rs}}$$

accordingly, $$f = \frac{1}{2\pi} \sqrt{\frac{\sqrt{a_x^2 + a_y^2 + a_z^2}}{Rs}}$$

$$= \sqrt{\frac{\sqrt{a_x^2 + a_y^2 + a_z^2}}{(2\pi)^2 \cdot Rs}}$$

When the rotary movement is only in X-Y plane, the above formula can be simplified as follows.

$$f = \sqrt{\frac{\sqrt{a_x^2 + a_y^2}}{(2\pi)^2 \cdot Rs}}$$

The correction-calculating unit 700 includes a correction-parameter storage 710, a correction-amount calculating unit 720 and the measurement data synthesizing unit 430.

The correction-amount calculating unit 720 includes a gain correction-amount calculating unit 721 and a phase-difference correction-amount calculating unit 722.

The arrangement and function of the gain correction-amount calculating unit 721 corresponds to those of the correction-amount calculating unit 420 of the first embodiment, where the correction amount D ($d_x$, $d_y$, $d_z$) is calculated using the correction parameters P ($p_x$, $p_y$, $p_z$).

Further, the correction-amount calculating unit 720 of the second embodiment includes the phase-difference correction-amount calculating unit 722.

The phase-difference correction-amount calculating unit 722 calculates a phase difference of command transmission between respective axes caused during the rotary movement on account of difference in signal transmission speed or drive gain in the respective drive axis directions as a phase-difference correction-amount φ.

The phase-difference correction-amount φ is represented as a function of the rotation frequency f (for instance, $\phi = b_2 f^2 + b_1 f + b_0$), of which correction parameters that are theoretically or experimentally obtained are stored in the correction-parameter storage 710.

Incidentally, specific process for determining the correction parameter for calculating the gain correction amount D and the phase-difference correction-amount φ will be described below in modifications 1 to 3 with reference to specific examples.

The measurement data synthesizing unit 430 synthesizes the detection value ($x_m$, $y_m$, $z_m$) of the drive sensor 140, the correction amount D ($d_x$, $d_y$, $d_z$) calculated by the correction-amount calculating unit 720 and the detection value ($x_p$, $y_p$, $z_p$) of the probe sensor 134 to acquire the position of the contact piece 132 of the scanning probe 130.

Further, the position data of the object surface is acquired considering the reference retraction Δr.

Data synthesizing process in the measurement data synthesizing unit 430 will be described below.

For the sake of explanation, an object surface measurement by scanning movement with a rotary movement in X-Y plane will be exemplified below.

The central coordinate of the rotary movement is represented as ($x_0$, $y_0$) and the radius of the circle is represented by R, the detection value ($x_m$, $y_m$) by the drive sensor 140 will be described below using a predetermined phase θ, $$x_m = x_0 + R \cos \theta$$

$$y_m = y_0 + R \sin \theta$$

which is corrected for the calculated gain correction amount ($d_x$, $d_y$) and the phase-difference correction-amount φ to be represented as follows.

Incidentally, $x_m'$ and $y_m'$ represent drive sensor detection value after being corrected.

$$x_m' = x_0 + R \cos \theta + d_x$$

$$y_m' = y_0 + R \sin(\theta + \phi) + d_y$$

The surface position of the object W is determined at a position correcting the position of the contact piece 132 determined by synthesizing the detection value ($x_m'$, $y_m'$) of the drive sensor 140 and the detection value of the probe sensor 134 with the predetermined reference retraction Δr.

The second embodiment offers the following advantages as well as the advantage of the first embodiment.

(2) The phase difference between the drive axes is corrected based on the rotation frequency f of the rotary movement calculated by the frequency-estimating unit 610.

Accordingly, accurate measurement data can be obtained by correcting the phase-difference error generated during the rotary movement.

(3) Since the rotation frequency f in measuring an arc portion is calculated by the frequency-estimating unit 610 based on the estimated acceleration calculated by the second-order differentiating unit 315, the rotation frequency f that varies during the scanning measurement of the arc portion can be accurately acquired.

(4) Since it requires some time to reach the commanded rotation frequency f during scanning measurement of a circle, when the correction process is based on the commanded rotation frequency f, only the data acquired after the scanning velocity (i.e. the rotation frequency f) becomes constant has to be corrected to obtain a measurement data without using the data acquired while being accelerated.

Figure 5:
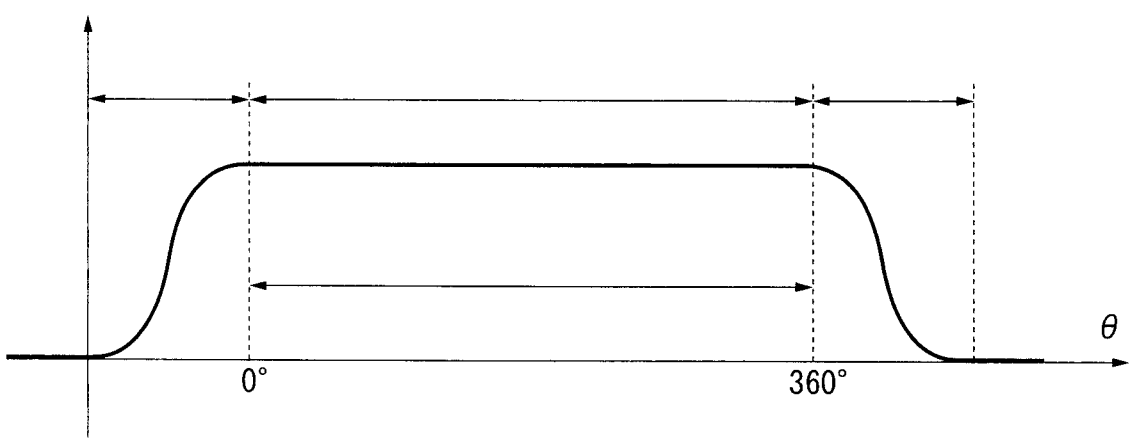
FIG. 5 is an illustration showing an instance where one-cycle (360°) data is acquired when a scanning velocity (or rotation frequency) indicates a constant value.

For instance, one-cycle (360°) data has to be acquired when the scanning velocity (i.e. rotation frequency f) indicates a constant value as shown in FIG. 5.

In contrast, since the rotary frequency f is calculated for each of the estimated acceleration and the correction amount can be calculated based on the calculated rotation frequency f, all of the acquired data can be corrected to acquire the measurement data without waiting for the scanning velocity (i.e. the rotation frequency f) to be stabilized at the constant value.

Figure 6:
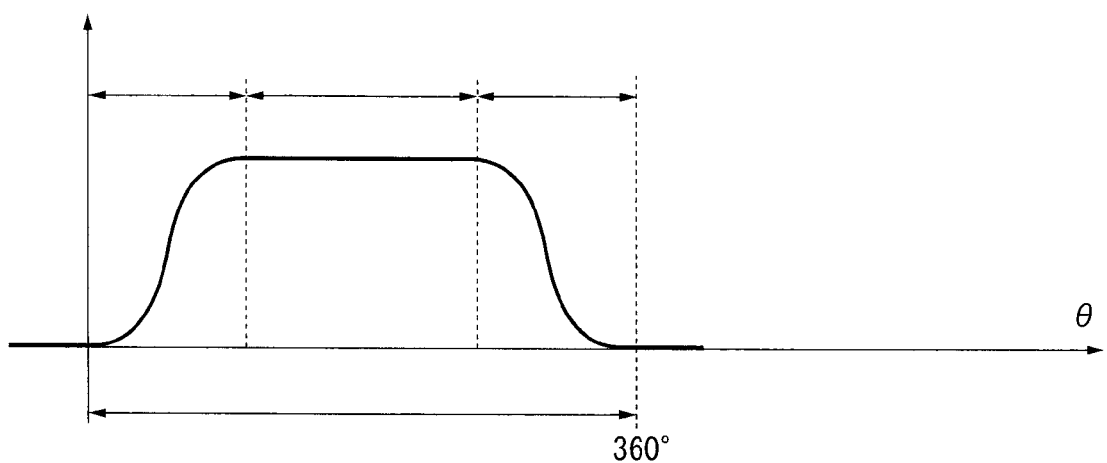
FIG. 6 is an illustration showing an instance where data is acquired when a scanning velocity (or rotation frequency) is varied (accelerated or decelerated).

For instance, as shown in FIG. 6, the data acquired in a range where the scanning velocity (or rotation frequency f) is varying (accelerated or decelerated) can be accurately corrected.

Accordingly, it is only required that the entire one-cycle (360°) is acquired, which improves the measurement work efficiency.

(Modification 1)

Next, a modification 1 of the invention will be described below.

The modification is basically the same as the second embodiment except for acquisition process of the correction parameters in determining the correction parameters.

The correction amount calculated by the correction-calculating unit 700 of the second embodiment includes the gain correction amount by the gain correction-amount calculating unit 721 and the phase-difference correction-amount by the phase-difference correction-amount calculating unit 722.

Initially, the determination of the correction parameters for calculating the gain correction amount will be described.

In the modification 1, in order to acquire the correction parameters of the gain correction amount, the following formula is established supposing that the deformation D of the spindle 124 correlates to the acceleration A.

$$D = k \cdot A$$

In order to simplify the description, rotary movement within X-Y plane will be exemplified.

When centripetal acceleration during the rotary movement is represented as a, acceleration $a_x$ in the Xm-axis direction is represented as follows, assuming that the scanning velocity is represented as V and the radius is represented as Rs.

$$a_x = \frac{V^2}{Rs} \cdot \frac{(x-x_0)}{Rs}$$

The deformation accompanied by acceleration correlates with the measurement position. Accordingly, considering the square term of the measurement coordinate, the deformation $d_x$ (in the Xm-axis direction) can be represented with reference to the acceleration $a_x$ caused in the Xm-axis direction as follows, $$d_x = \left(\frac{V^2}{R_s} \times \frac{x-x_0}{R_s}\right) \times (\alpha_1 x^2 + \alpha_2 x + \alpha_3)$$

which is represented as follows including the correction amount $d_y$ in the Ym-axis direction and the correction amount $d_z$ in the Zm-axis direction.

$$\begin{pmatrix} d_x \\ d_y \\ d_z \end{pmatrix} = \frac{V^2}{R_s} \begin{pmatrix} \alpha_1(x-x_0) & \alpha_2(x-x_0) & \alpha_3(x-x_0) \\ \alpha_4(x-x_0) & \alpha_5(x-x_0) & \alpha_6(x-x_0) \\ \alpha_7(x-x_0) & \alpha_8(x-x_0) & \alpha_9(x-x_0) \end{pmatrix} \begin{pmatrix} x^2 \\ x \\ 1 \end{pmatrix}$$

However, since the deformation D correlates to all of the x, y, z components, the coefficient of the correction is represented as follows.

$$\begin{pmatrix} \alpha_1 \\ \alpha_2 \\ \vdots \\ \alpha_9 \end{pmatrix} = \begin{pmatrix} \beta_1 & \beta_2 & \beta_3 \\ \beta_4 & \beta_5 & \beta_6 \\ \vdots & \vdots & \vdots \\ \beta_{25} & \beta_{26} & \beta_{27} \end{pmatrix} \begin{pmatrix} y^2 \\ y \\ 1 \end{pmatrix}$$

$$\begin{pmatrix} \beta_1 \\ \beta_2 \\ \vdots \\ \beta_{27} \end{pmatrix} = \begin{bmatrix} \gamma_1 & \gamma_1 & \gamma_1 \\ \gamma_1 & \gamma_1 & \gamma_1 \\ \vdots & \vdots & \vdots \\ \gamma_1 & \gamma_1 & \gamma_1 \end{bmatrix} \begin{pmatrix} z^2 \\ z \\ 1 \end{pmatrix}$$

With the above condition, the correction parameters can be acquired as coefficients of a fitting curve after actual experiments and error acquisition.

An example of the actual experiment will be described below.

The deformation on account of acceleration differs according to the position. So, when a calibration data is to be acquired, calibration tests for scanning measurement of a circle are conducted at a plurality of scanning velocities (or accelerations) while placing reference gauges at a plurality of different positions.

Figure 7:
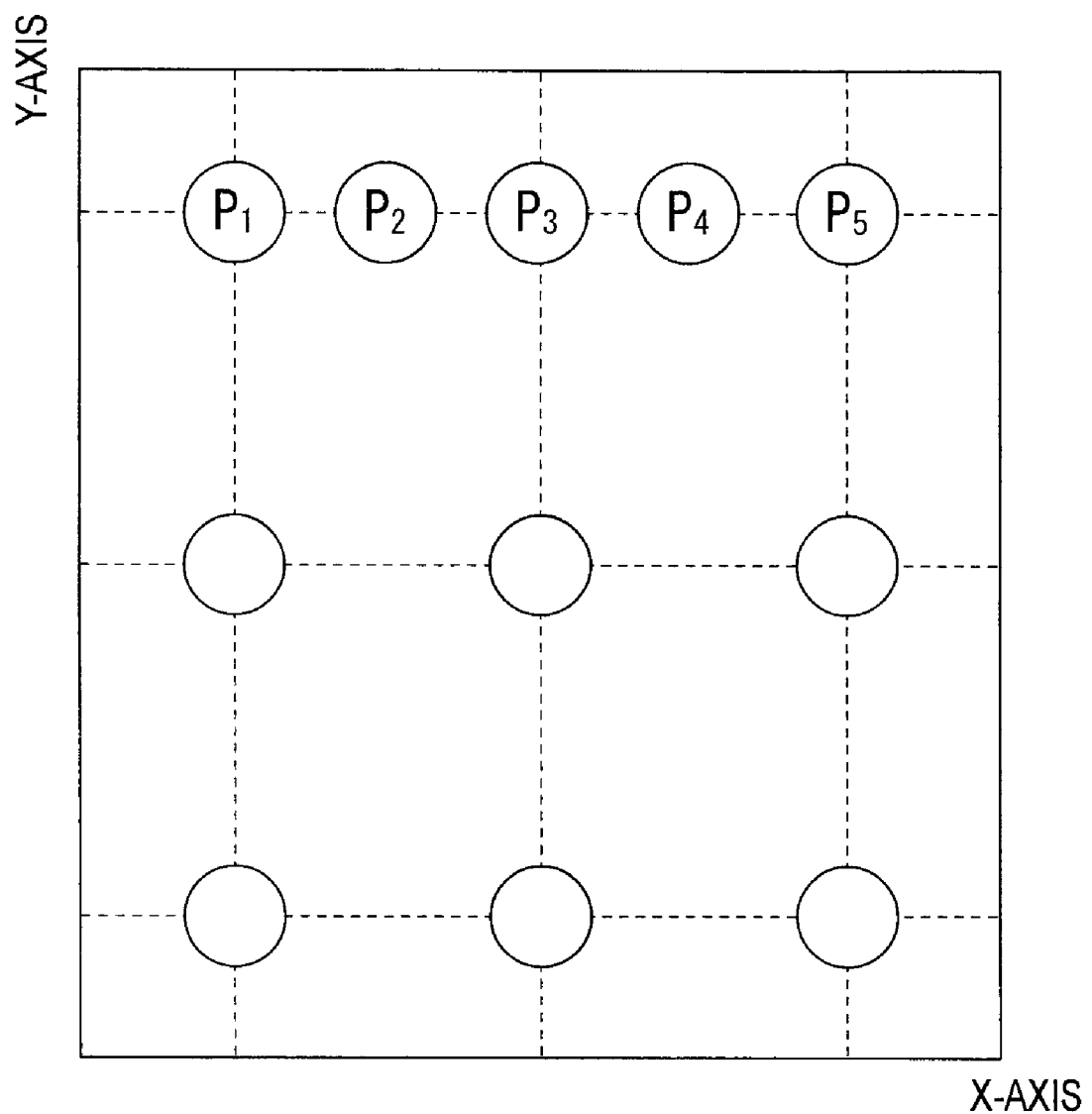
FIG. 7 is an illustration showing how a scanning measurement is to be conducted on a circle at a plurality of positions ($P_1$ to $P_5$) in order to acquire a calibration data.

For instance, scanning measurement of a circle is conducted at a plurality of positions ($P_1$ to $P_5$) as shown in FIG. 7.

Incidentally, though five points having the same Ym coordinate and different Xm coordinates are selected in FIG. 7 for the convenience of explanation, it is preferable that all of the Xm coordinate, Ym coordinate and Zm coordinate are dispersively applied to the selected points within the measurement area of the measurement system 100.

Figure 8:
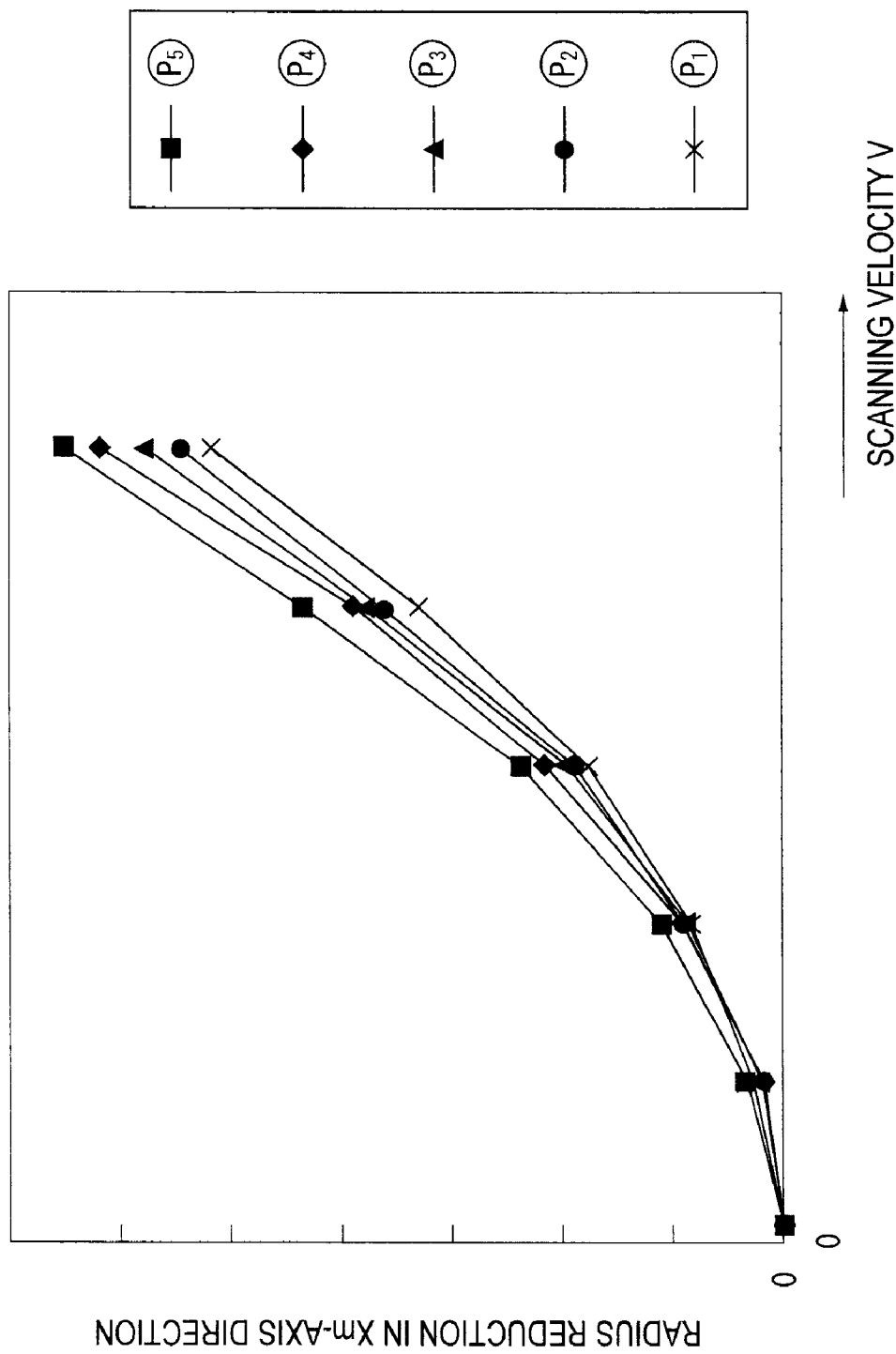
FIG. 8 is a graph showing a relationship between a scanning velocity V and a detected radius reduction ΔR when scanning measurement is conducted on a circle at the respective points ($P_1$ to $P_5$).
Figure 9:
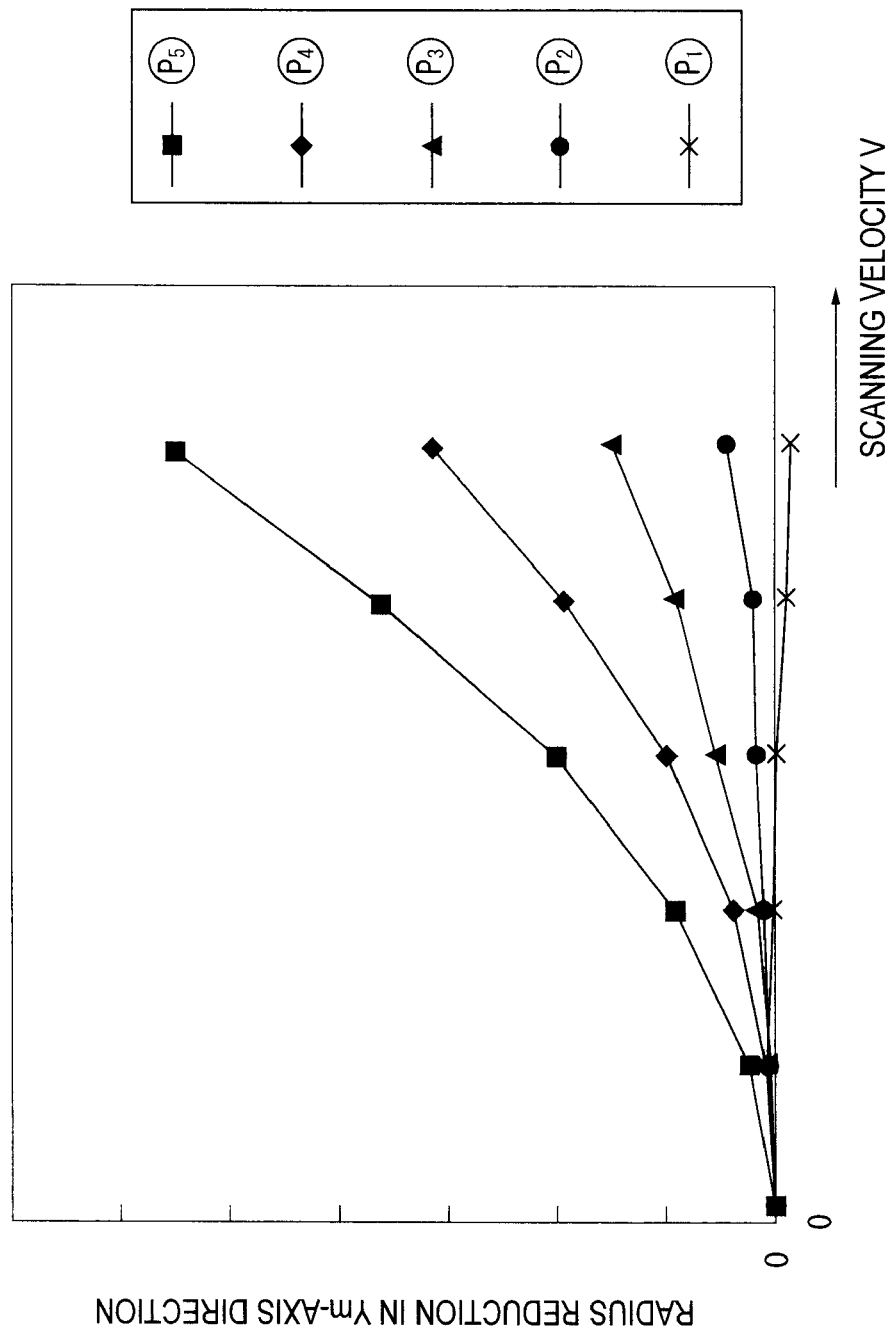
FIG. 9 is another graph showing a relationship between the scanning velocity V and the detected radius reduction ΔR when scanning measurement is conducted on a circle at the respective points ($P_1$ to $P_5$).

FIGS. 8 and 9 are graphs showing a relationship between a scanning velocity V and a detected radius reduction (radius error) ΔR when scanning measurement is conducted on a circle at the respective points ($P_1$ to $P_5$).

Figure 23:
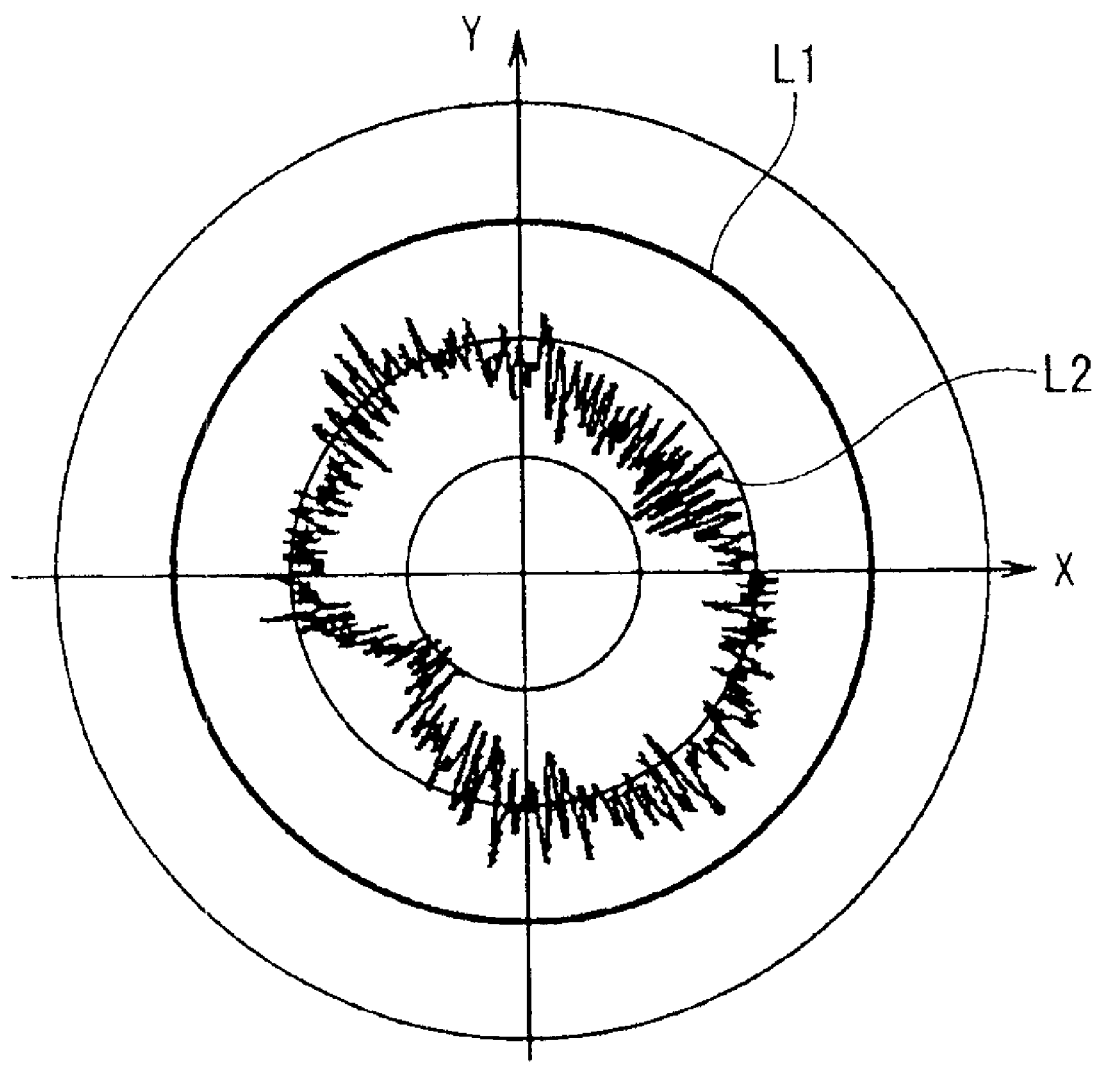
FIG. 23 is an illustration showing a resultant measurement error in the form of a radial displacement

As shown in FIG. 23, when scanning measurement is conducted on a circle, ellipsoidal error is generated on account of difference in gain between X-axis direction and Y-axis direction.

Accordingly, the vertical axis in FIG. 8 represents the maximum of the radius error ΔR in the Xm-axis direction and the vertical axis in FIG. 9 represents the maximum of the radius error ΔR in the Ym-axis direction.

Figure 10:
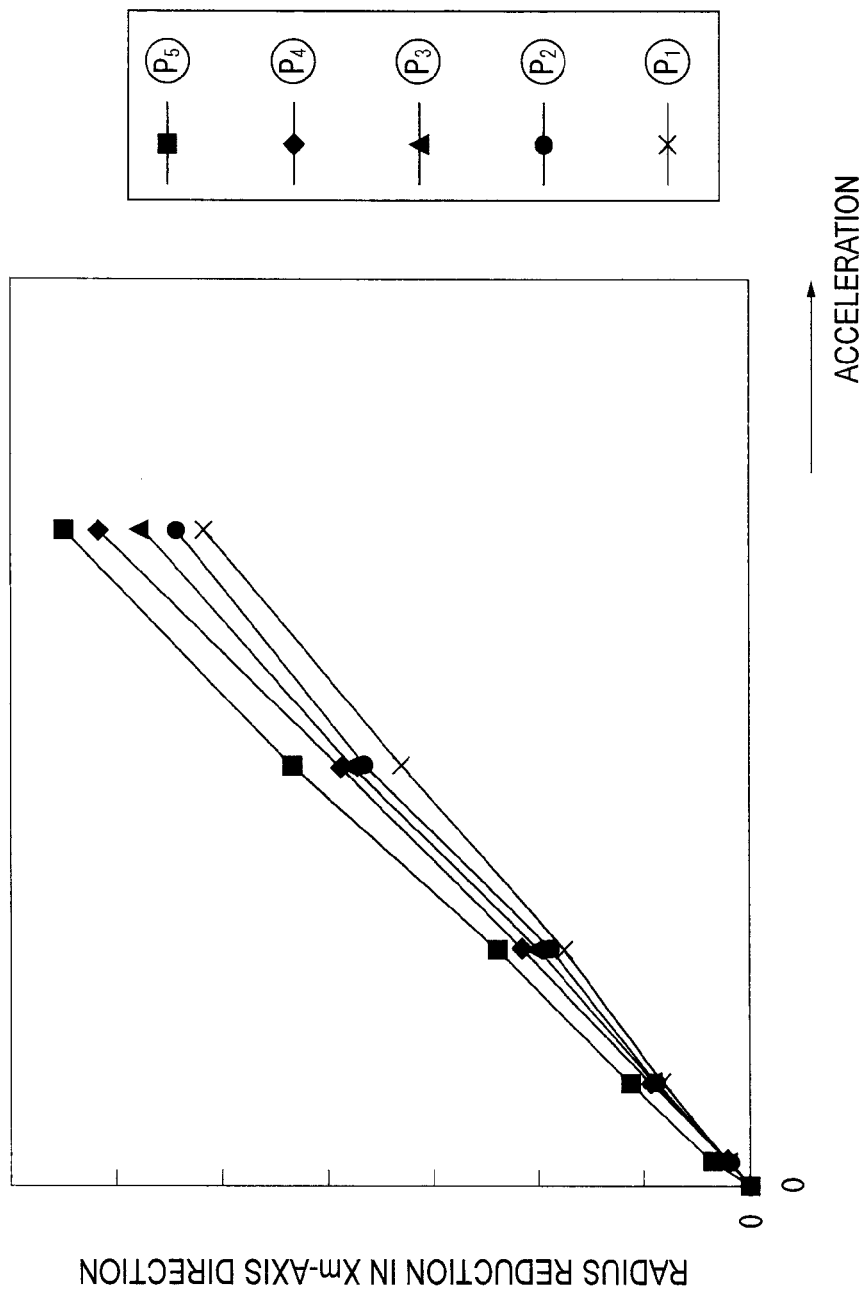
FIG. 10 is a graph showing a relationship between the radius reduction and acceleration.
Figure 11:
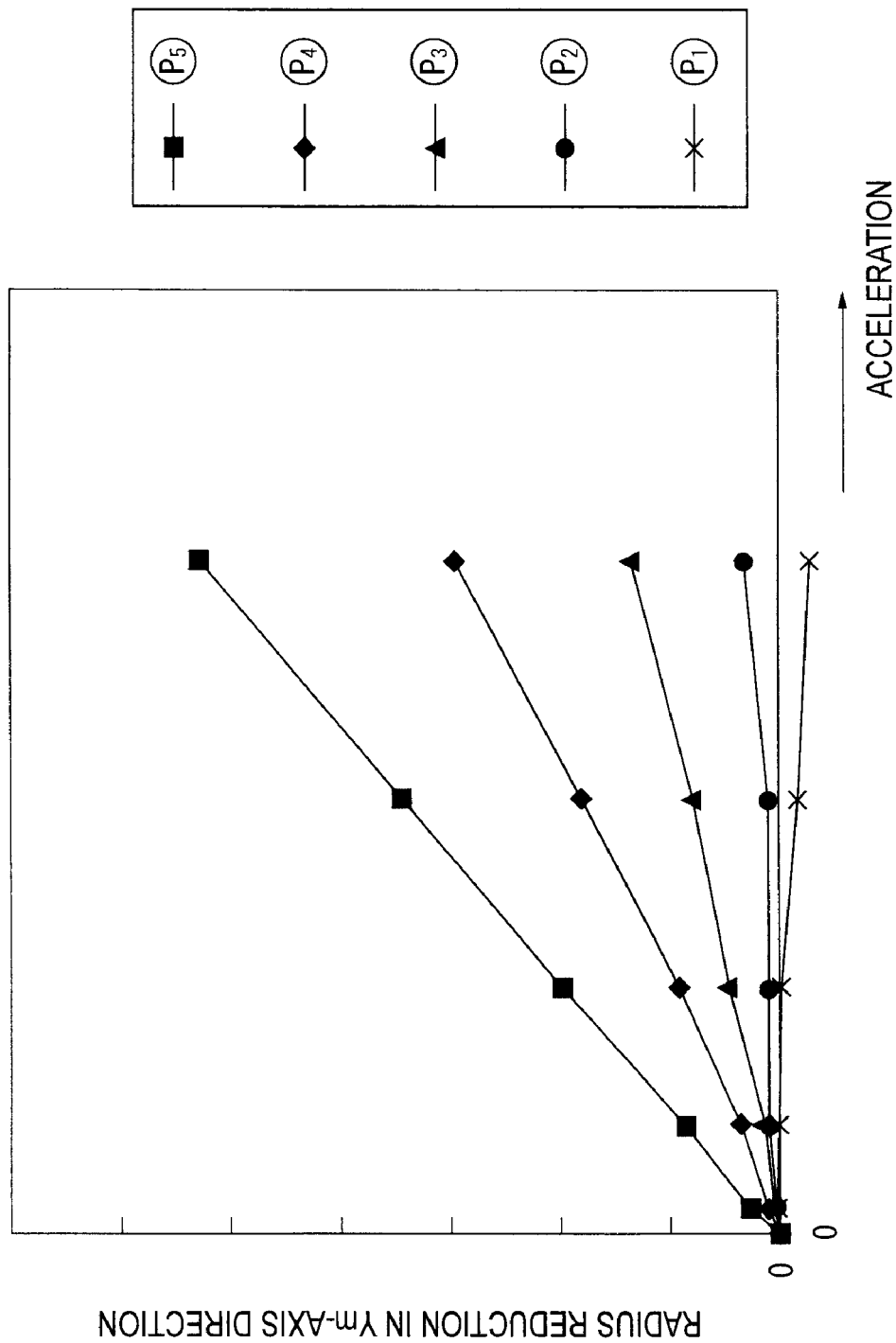
FIG. 11 is another graph showing a relationship between the radius reduction and acceleration.

FIGS. 10 and 11 are graphs showing a relationship between radius reduction ΔR and acceleration while converting the scanning velocity in FIGS. 8 and 9 into acceleration.

The vertical axis in FIG. 10 represents the maximum of the radius error ΔR in the Xm-axis direction in the same manner as FIG. 8 and the vertical axis in FIG. 11 represents the maximum of the radius error ΔR in the Ym-axis direction in the same manner as FIG. 9.

FIGS. 8 and 9 show that the measurement radius reduction ΔR correlates to power (e.g. square) of the scanning velocity in both of the Xm-axis and Ym-axis directions. However, FIGS. 10 and 11 show proportionality of the measurement radius reduction ΔR to acceleration, where the above formula (D−k·A) applies.

Figure 12:
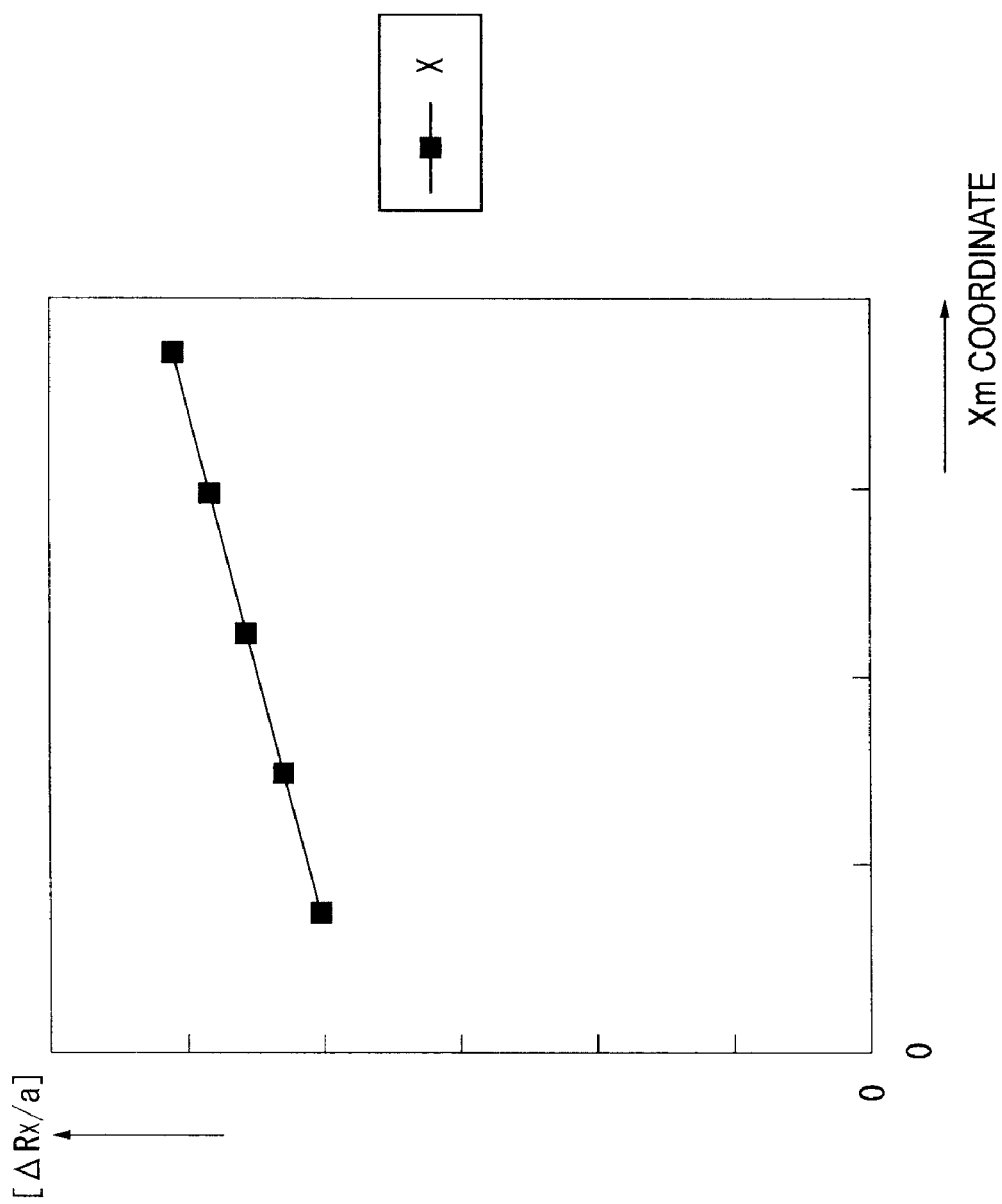
FIG. 12 is a graph showing a relationship between the measurement position and measurement radius reduction.
Figure 13:
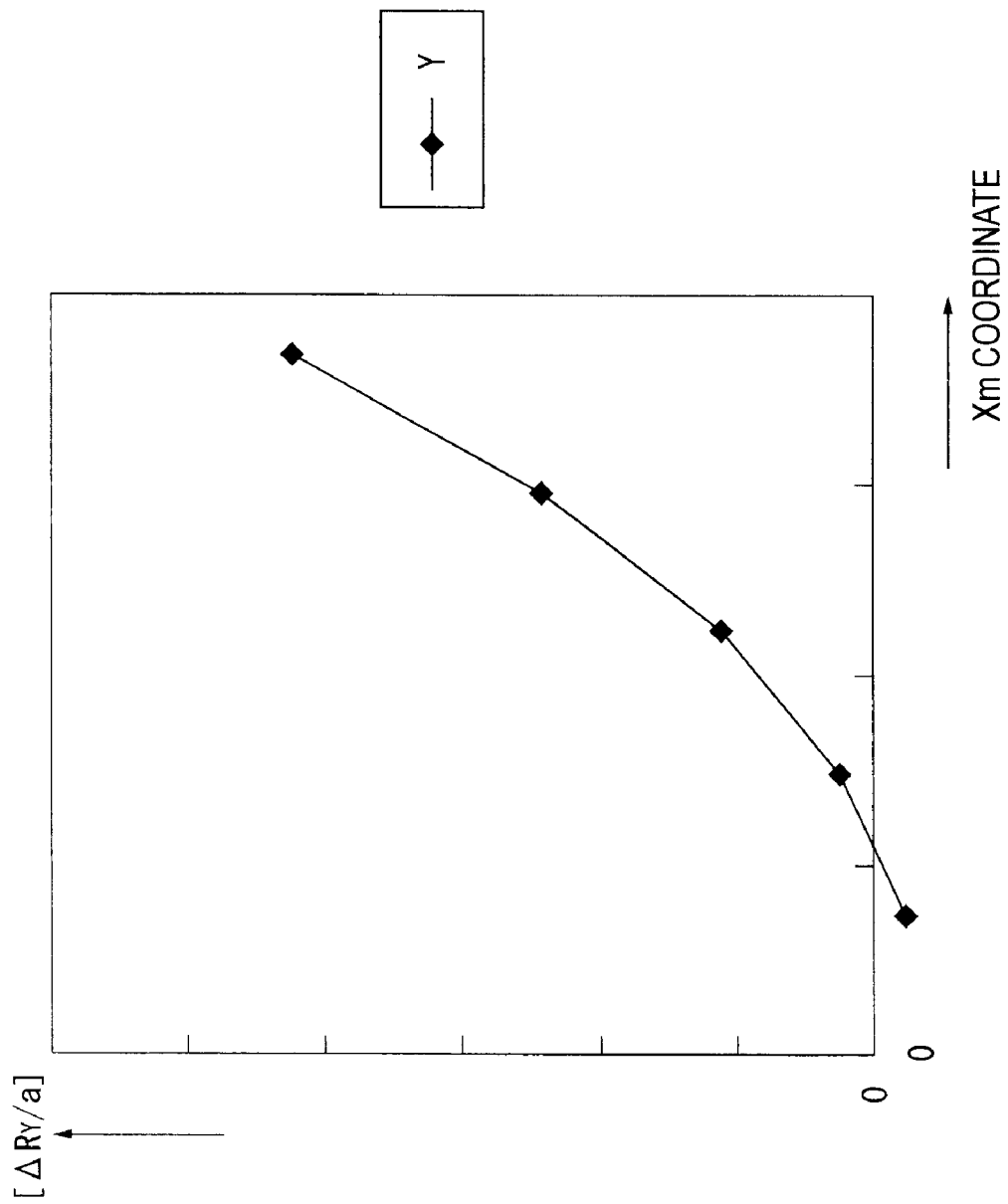
FIG. 13 is another graph showing a relationship between the measurement position and measurement radius reduction.

FIGS. 12 and 13 are graphs showing a relationship between a measurement position and measurement radius reduction ΔR.

In FIGS. 12 and 13, the vertical axis is represented by normalized division of the measurement radius reduction ΔR with acceleration.

The vertical axis of FIG. 12 represents a division of the maximum of the radius error ΔR in the Xm-axis direction by the acceleration a. The vertical axis of FIG. 13 represents a division of the maximum of the radius error ΔR in the Ym-axis direction by the acceleration a.

FIG. 12 shows that the measurement radius reduction ΔR correlates to a first order of Xm coordinate of the measurement position.

Further, FIG. 13 shows that the measurement radius reduction ΔR in the Ym-axis direction correlates to a second order of the Xm coordinate of the measurement position being influenced by the difference in the measurement position in the Xm-axis direction.

By collecting the experimental data, the error (dx, dy, dz) when the reference gauge is measured with different scanning velocities (or accelerations) at positions with different Xm, Ym and Zm coordinates is assigned to a formula.

The gain correction parameters can be obtained by solving the formula.

The obtained gain correction parameters are stored in the correction-parameter storage 710.

Next, the determination of the correction parameters for calculating the phase-difference correction-amount φ will be described.

Phase difference of command transmission occurs between the respective axes during rotary movement on account of difference in signal transmission speed of drive gain in each of drive axis directions.

The phase-difference correction-amount φ is equivalent to the above phase difference, which is calculated as a function of the rotation frequency f of the rotary movement.

In order to simplify the description, rotary movement within X-Y plane will be exemplified.

The phase-difference correction-amount φ is a function of the rotation frequency f of the rotary movement, which is represented as polynomial expression of the rotation frequency f.

An example of actual experiment will be described below.

Figure 14:
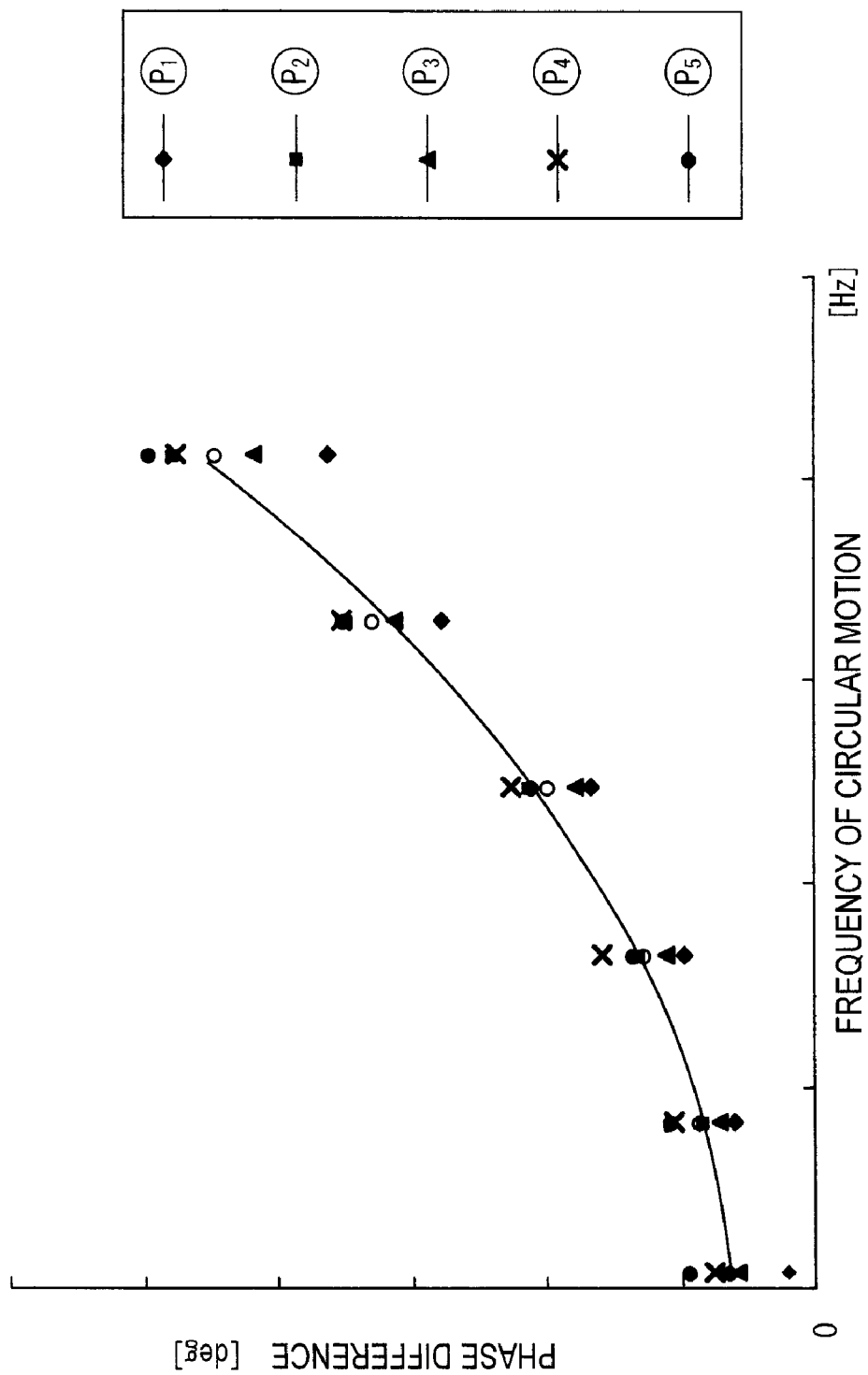
FIG. 14 is a graph showing a relationship between a phase difference φ generated in the Ym-axis direction and Xm-axis direction and a rotation frequency f of a rotary movement.

FIG. 14 shows a result of scanning measurement of a circle conducted at the plurality of positions ($P_1$ to $P_5$) shown in FIG. 7.

In FIG. 14, the phase difference φ generated between Ym-axis direction and Xm-axis direction is plotted on the vertical axis and the rotation frequency f of the rotary movement is plotted on the horizontal axis.

As shown in FIG. 14, the phase difference φ between Ym-axis direction and Xm-axis direction is dependent on the rotary frequency f of the rotary movement.

Further, though less influenced, the phase difference φ is also dependent on measurement position.

Accordingly, the phase difference φ is represented as: $\phi = b_2 f^2 + b_1 f + \phi_0$, where the compensation coefficients $b_2$, $b_1$ and $\phi_0$ are determined according to a fitting curve.

Since the compensation coefficients $b_2$, $b_1$ and $\phi_0$ are influenced by the measurement position, the phase difference φ is represented as follows:

$$\phi = b_2 f^2 + b_1 f + \phi_0$$

$$\begin{pmatrix} b_2 \\ b_1 \\ \phi_0 \end{pmatrix} = \begin{pmatrix} \sigma_1 & \sigma_2 & \sigma_3 \\ \sigma_4 & \sigma_5 & \sigma_6 \\ \sigma_7 & \sigma_8 & \sigma_9 \end{pmatrix} \begin{pmatrix} x^2 \\ x \\ 1 \end{pmatrix}$$

$$\begin{pmatrix} \sigma_1 \\ \sigma_2 \\ \vdots \\ \sigma_9 \end{pmatrix} = \begin{pmatrix} \varsigma_1 & \varsigma_2 & \varsigma_3 \\ \varsigma_4 & \varsigma_5 & \varsigma_6 \\ \vdots & \vdots & \vdots \\ \varsigma_{25} & \varsigma_{26} & \varsigma_{27} \end{pmatrix} \begin{pmatrix} y^2 \\ y \\ 1 \end{pmatrix}$$

$$\begin{pmatrix} \varsigma_1 \\ \varsigma_2 \\ \varsigma_3 \\ \vdots \\ \varsigma_{27} \end{pmatrix} = \begin{pmatrix} \tau_1 & \tau_2 & \tau_3 \\ \tau_4 & \tau_5 & \tau_6 \\ \tau_7 & \tau_8 & \tau_9 \\ \vdots & \vdots & \vdots \\ \tau_{79} & \tau_{80} & \tau_{81} \end{pmatrix} \begin{pmatrix} z^2 \\ z \\ 1 \end{pmatrix}$$

With the use of thus calculated correction parameter, the gain correction amount D and the phase-difference correction-amount φ are calculated as described in the second embodiment.

Using the gain correction amount D and the phase-difference correction-amount φ, the measurement data can be corrected as described in the second embodiment.

(Modification 2)

Next, a modification 2 of the invention will be described below.

The modification 2 is basically the same as the second embodiment except for acquisition process of the correction parameters in determining the correction parameters.

Specifically, though the formula for determining the deformation is established based on an assumption that the deformation of the spindle 124 correlates to acceleration in the modification 1, the modification 2 uses a formula based on an assumption that the deformation of the spindle 124 correlates to the rotation frequency f.

Incidentally, though the correction amount includes the gain correction amount and the phase-difference correction-amount, since the same process as the modification 1 can be used for determining the correction parameters for calculating the phase-difference correction-amount, explanation therefor is not mentioned herein.

Initially, the determination of the correction parameters for calculating the gain correction amount will be described.

In the modification 2, assuming that the gain correction amount correlates to the rotation frequency f, the relationship between the gain $|G_z|$ of the drive frequency transfer function $G_1$ and the rotation frequency f of the rotary movement is represented by the following formula:

$$|G_1| = 1 - k(2\pi \cdot f)^2$$

In order to derive the above formula, following modification is exemplified.

If there is deformation D when the rotary movement of radius Rs is commanded, the gain $|G_1|$ of the frequency transfer function $G_1$ is represented by the following formula:

$$|G_1| = \frac{(Rs - D)}{Rs}$$
$$= 1 - \frac{D}{Rs}$$

Since the deformation D is proportional to acceleration A (i.e. $D = k \cdot A$), the formula is further modified as follows:

$$|G_1| = 1 - \frac{k \cdot A}{Rs}$$

Here, acceleration A is represented by the formula using the rotation frequency f based on the relationship between the radius Rs of the rotary movement and the angular velocity ω.

$$A = Rs \cdot \omega^2$$
$$= Rs \cdot (2\pi \cdot f)^2$$

Accordingly, the gain $|G_1|$ of the transfer function can be represented as follows:

$$|G_1| = 1 - \frac{k \cdot Rs \cdot (2\pi \cdot f)^2}{Rs}$$
$$= 1 - k(2\pi \cdot f)^2$$

Based on the relational expression, the correction parameter k for determining the relationship between the gain and the rotation frequency f is determined according to designed value or experimental value.

The gain $|G_1|$ is calculated for each of Xm-axis direction and Ym-axis direction.

In other words, the gain $|G_{1X}|$ in the Xm direction and the gain $|G_{1Y}|$ in the Ym direction are calculated.

When the gain $|G_{1X}|$ and $|G_{1Y}|$ are calculated, a scanning measurement is conducted on a circle at different positions and at different rotation frequency f in the same manner as in the modification 1, based on the result of which the $|G_{1X}|$ and $|G_{1Y}|$ can be expressed as a function of the position ($x_m$, $y_m$) and the rotation frequency f.

Further, the measurement value is corrected as follows considering thus calculated gain correction amount ($|G_{1X}|$, $|G_{1Y}|$) and the phase-difference correction-amount φ.

When the detection value of the drive sensor 140 is ($x_m$, $y_m$), the central coordinate of the rotary movement is represented as ($x_0$, $y_0$) and the radius of the circle is represented by Rs, the detection value by the drive sensor 140 can be represented using the predetermined phase θ as follows, $$x_m = x_0 + R\cos\theta$$

$$y_m = y_0 + R\sin\theta$$

which is corrected for the calculated gain correction amount ($|G_{1X}|$, $|G_{1Y}|$) and the phase-difference correction-amount φ to be represented as follows.

Incidentally, $x_m'$ and $y_m'$ represent drive sensor detection value after being corrected.

$$x_m' = x_0 + R \cdot g_{1x} \cdot \cos\theta$$

$$y_m' = y_0 + R \cdot g_{1y} \cdot \sin(\theta + \phi)$$

where $$g_{1x} = \frac{1}{|G_{1X}|},\ g_{1y} = \frac{1}{|G_{1Y}|}$$

The surface position of the object W is determined at a position correcting the position of the contact piece 132 determined by synthesizing the detection value ($x_m'$, $y_m'$) of the drive sensor 140 and the detection value of the probe sensor 134 considering the predetermined reference retraction Δr.

As described above, the correction parameters for calculating the gain correction amount can be obtained by the method of the modification 2.

Further, with the use of the gain correction amount and the phase-difference correction-amount, the measurement data can be corrected.

(Modification 3)

Next, a modification 3 of the invention will be described below.

The modification 3 is basically the same as the second embodiment except for acquisition process of the correction parameters in determining the correction parameters.

Specifically, though it is assumed that the deformation is represented by a theoretical expression correlated to the rotation frequency f for establishing the correction formula in the modification 2, the correction formula of the modification 3 is based on an assumption that the deformation is represented by a polynomial expression using the rotation frequency f.

Specifically, it is assumed that the gain correction amount $|G_{1X}|$ in the Xm-axis direction and the gain correction amount $|G_{1Y}|$ in the Ym-axis direction are represented by a polynomial formula relating to the rotation frequency f of the rotary movement during the scanning measurement of a circle.

An example of actual experiment will be described below.

In acquiring a calibration data, a reference gauge is placed at a plurality of different positions to conduct a scanning measurement of a circle at a plurality of scanning velocities.

Figure 15:
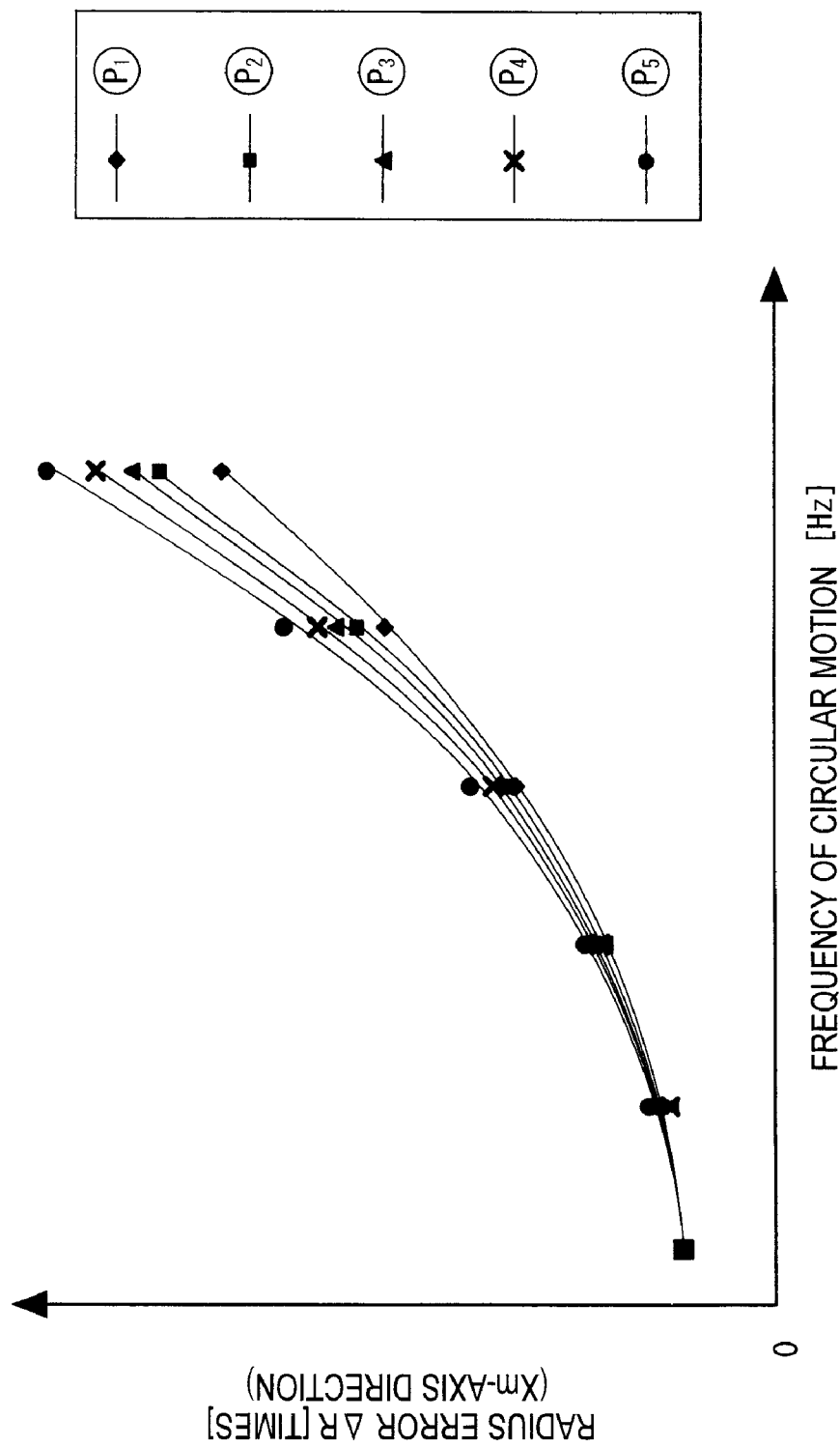
FIG. 15 is a graph showing a relationship between a rotary frequency during a scanning measurement and radius error ΔR.

FIG. 15 is a graph in which rotation frequency during the scanning measurement is plotted in horizontal axis and the maximum radius error ΔR in the Xm-axis direction is plotted in vertical axis.

Figure 16:
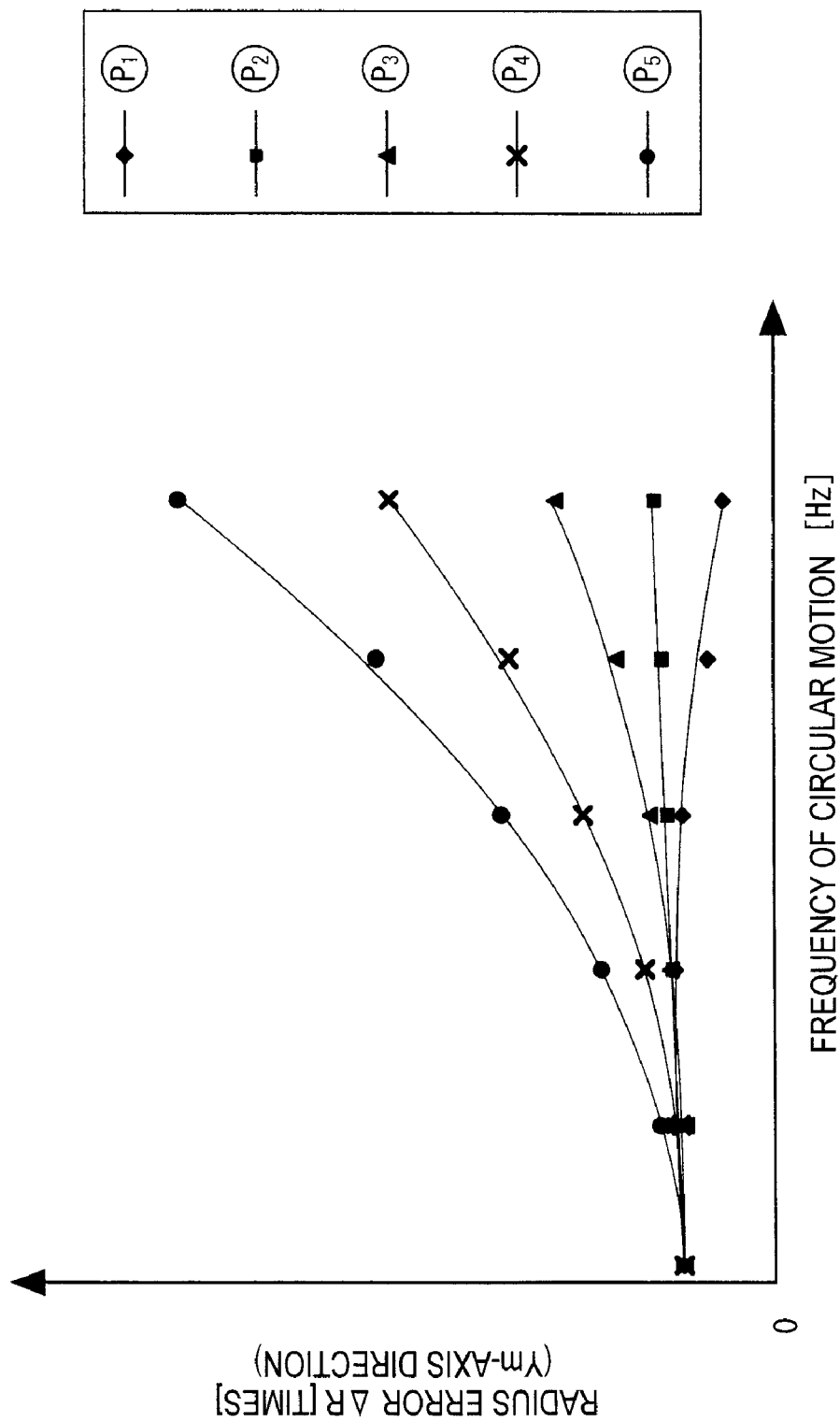
FIG. 16 is another graph showing a relationship between the rotary frequency during a scanning measurement and the radius error ΔR.

FIG. 16 is a graph in which rotation frequency during the scanning measurement is plotted in horizontal axis and the maximum radius error ΔR in the Ym-axis direction is plotted in vertical axis.

The measurement position is defined in the same manner as the modification 1. Results of scanning measurement of a circle conducted at the plurality of positions ($P_1$ to $P_5$) shown in FIG. 7 are shown.

In either of the Xm-axis direction in FIG. 15 and the Ym-axis direction in FIG. 16, the relationship between the rotation frequency of the scanning measurement and the measurement error can be fitted in a second-order polynomial expression of the rotation frequency f, where the gain error $|G_{1X}|$ in the Xm-axis direction (Xm direction of radius error ΔR) and the gain error $|G_{1Y}|$ in the Ym-axis direction (Ym direction of radius error ΔR) can be represented as follows using predetermined coefficients.

$$|G_{1X}| = \phi_2 f^2 + \phi_1 f + 1$$

$$|G_{1Y}| = \eta_2 f^2 + \eta_1 f + 1$$

Further, since the deformation is dependent on the measurement position, the deformation is a function of the measurement position.

Figure 17:
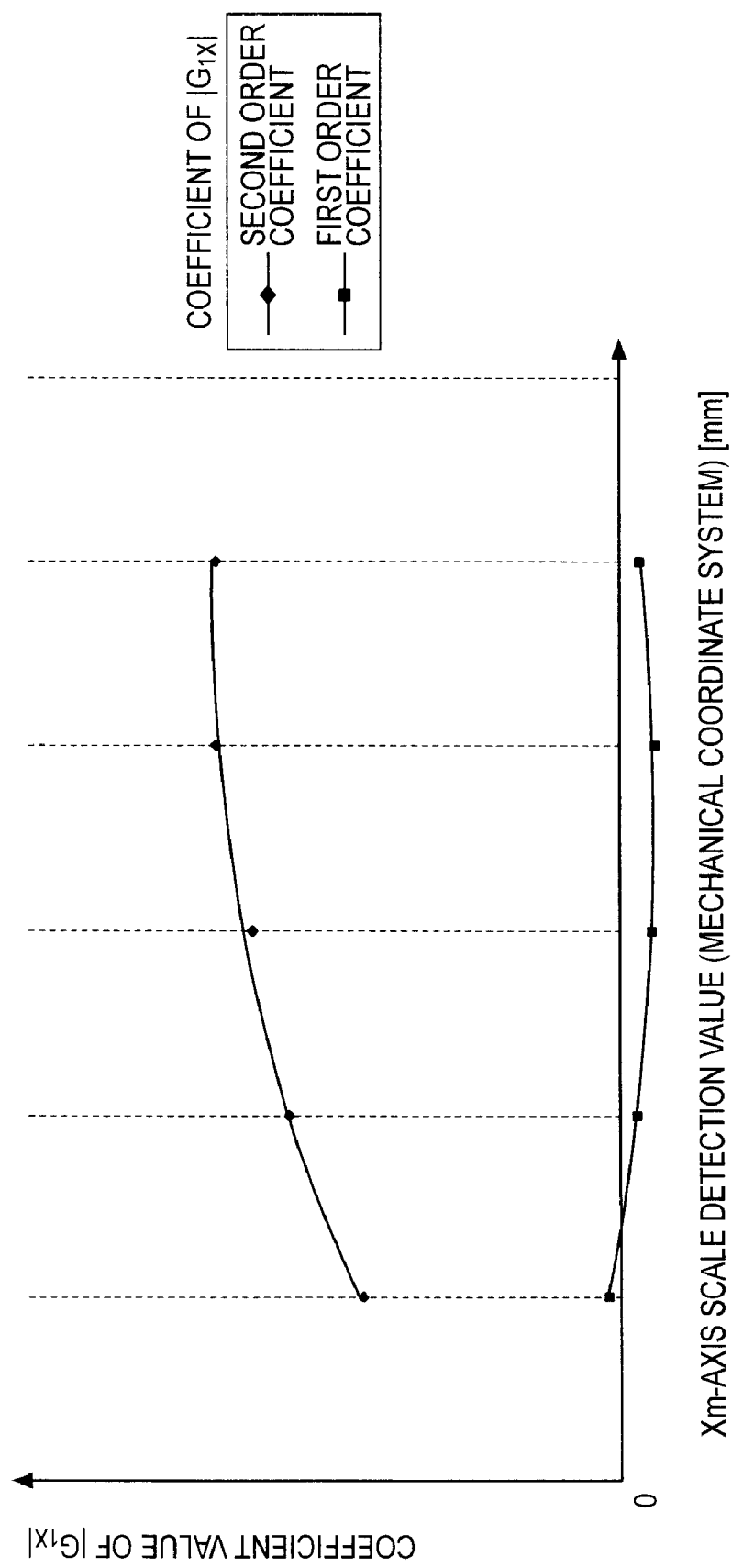
FIG. 17 is a graph showing a relationship between a gain error coefficient and coordinate.

FIG. 17 is a graph showing a relationship between the coefficient of the gain error $|G_{1X}|$ in the Xm-axis direction and Xm coordinate.

Figure 18:
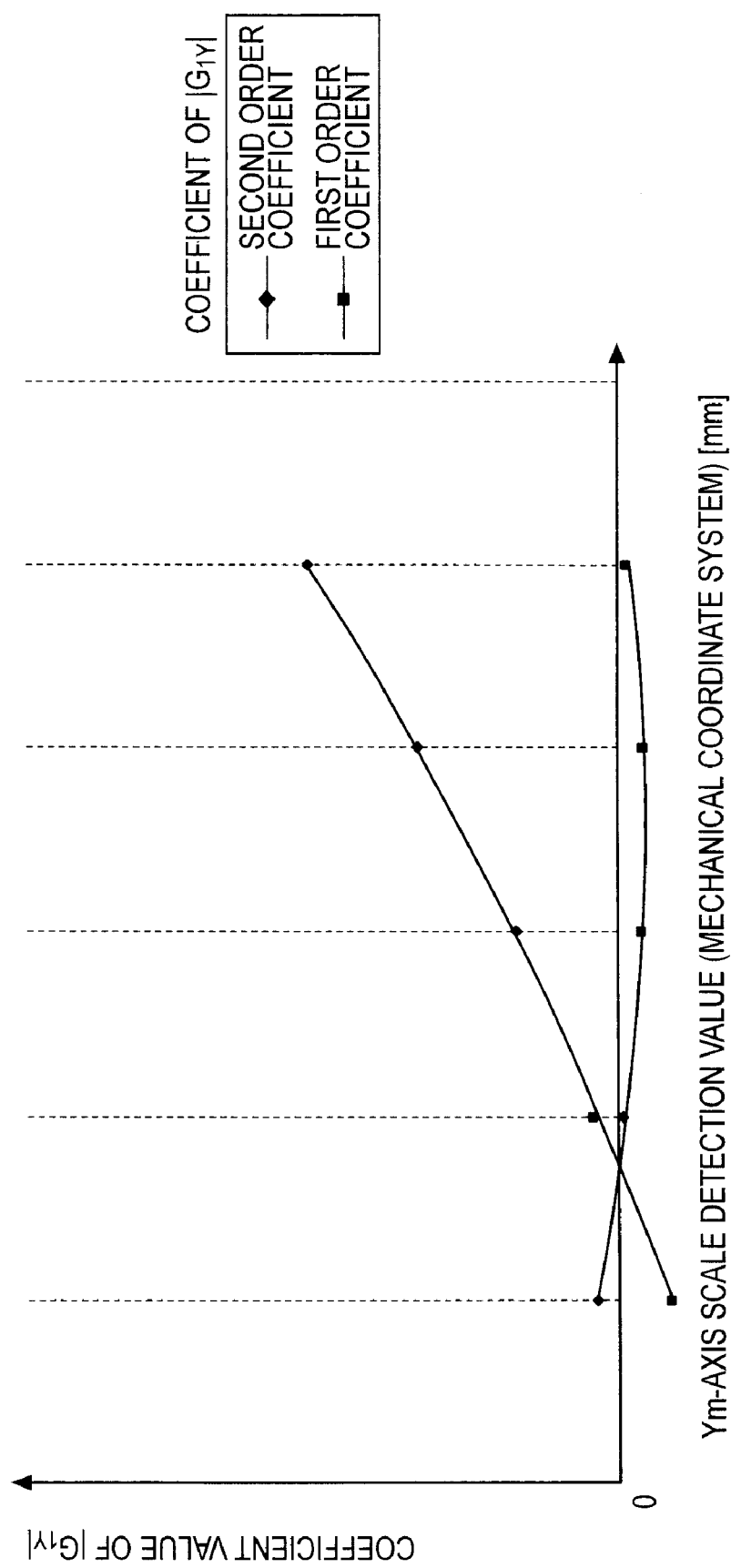
FIG. 18 is another graph showing a relationship between a gain error coefficient and coordinates.

FIG. 18 is another graph showing a relationship between the coefficient of the gain error $|G_{1Y}|$ in the Ym-axis direction and Ym coordinate.

In other words, the coefficients $\psi_2$, $\psi_1$, $\eta_2$, $\eta_1$ depends on the measurement position, which can be represented as follows.

The coefficients $\psi_2$, $\psi_1$ used in the formula for calculating a gain in the Xm-axis direction is a function of the Xm coordinate and can be respectively represented as follows.

$$\phi_2 = \mu_{22} \cdot x^2 + \mu_{21} \cdot x + \mu_{20}$$

$$\phi_1 = \mu_{12} \cdot x^2 + \mu_{11} \cdot x + \mu_{10}$$

The coefficients $\eta_2$, $\eta_1$ used in the formula for calculating a gain in the Ym-axis direction is a function of the Ym coordinate and can be respectively represented as follows.

$$\eta_2 = \nu_{22} \cdot y^2 + \nu_{21} \cdot y + \nu_{20}$$

$$\eta_1 = \nu_{12} \cdot y^2 + \nu_{11} \cdot y + \nu_{10}$$

The correction parameters $\Gamma_2$, $\Gamma_1$, $\eta_2$, $\eta_1$ for determining the relationship between the gain and the rotation frequency is determined based on the relational expressions.

The obtained gain correction parameters are stored in the correction-parameter storage 710.

In order to correct the measurement value during the actual measurement, the correction calculation is conducted according to the following formula based on the gain correction amount ($|G_{1X}|$, $|G_{1Y}|$) and the phase-difference correction-amount φ in the same manner as the modification 2.

$$x_m' = x_0 + R \cdot g_{1x} \cdot \cos\theta$$

$$y_m' = y_0 + R \cdot g_{1y} \cdot \sin(\theta + \phi)$$

where $$g_{1x} = \frac{1}{|G_{1X}|},\ g_{1y} = \frac{1}{|G_{1Y}|}$$

The correction parameters for calculating the gain correction amount can also be obtained by the method of the modification 3.

Further, with the use of the gain correction amount and the phase-difference correction-amount, the measurement data can be corrected.

Third Embodiment

Next, a third embodiment of the invention will be described below.

The basic arrangement of the third embodiment is the same as that of the second embodiment. The distinctive feature of the third embodiment is the provision of an estimation-judging unit 800 for judging the accuracy of the acceleration estimation by comparing the acceleration estimated value calculated by the movement-estimating unit 600 with actual acceleration is provided.

Figure 19:
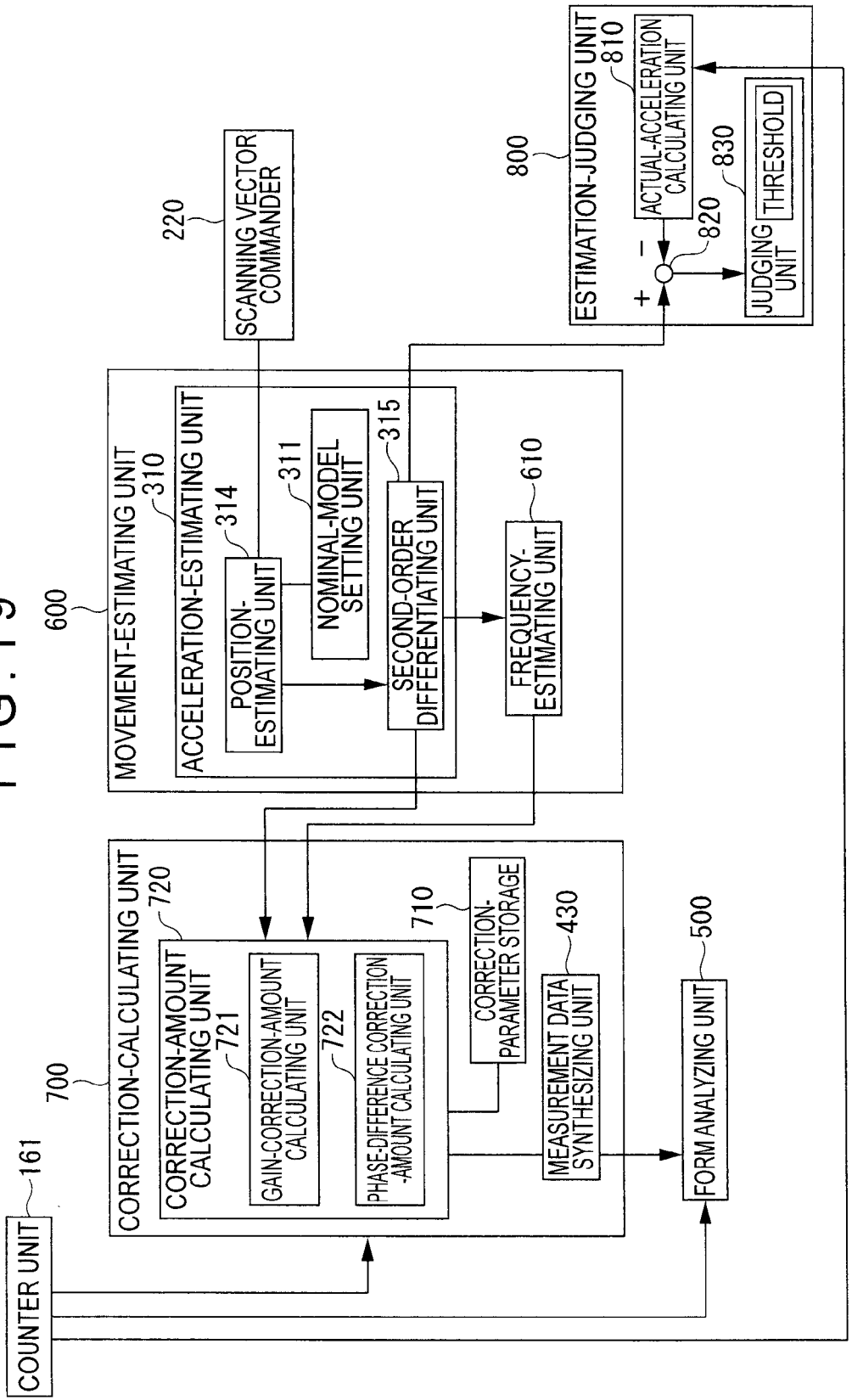
FIG. 19 is a block diagram showing an arrangement of movement-estimating unit, correction-calculating unit and estimation-judging unit according to a third embodiment of the invention.

FIG. 19 is a block diagram showing an arrangement of the movement-estimating unit 600, the correction-calculating unit 700 and the estimation-judging unit 800 according to the third embodiment.

The estimation-judging unit 800 includes: an actual-acceleration calculating unit 810 for calculating the actual acceleration based on measurement value of the coordinates detected by the counter unit 161; a difference-calculating unit 820 for calculating the difference between the estimated acceleration calculated by the movement-estimating unit 600 and the actual acceleration calculated by the acceleration-estimating unit 310; and a judging unit 830 for comparing the difference calculated by the difference-calculating unit 820 to a predetermined threshold to judge the accuracy of the estimated acceleration.

The drive amount of the drive mechanism 120 measured by the drive counter 171 is input into the actual-acceleration calculating unit 810. The actual-acceleration calculating unit 810 conducts a second-order differentiation on the drive amount of the drive mechanism 120 measured by the drive counter 171 to calculate the actual acceleration.

The calculated actual acceleration is output to the difference-calculating unit 820.

Estimated acceleration from the second-order differentiating unit 315 and the actual acceleration from the actual-acceleration calculating unit 810 are input to the difference-calculating unit 820.

The difference-calculating unit 820 subtracts the actual acceleration $a_R$ from the estimated acceleration a to calculate a difference $\delta_a$.

The calculated difference $\delta_a$ is output to the judging unit 830.

A threshold $\delta_s$ is stored in advance in the judging unit 830.

The threshold $\delta_s$ is set for judging whether the difference $\delta_a$ between the estimated acceleration a and the actual acceleration $a_R$ is too large and correction based on the estimated acceleration is impossible so that the acceleration estimation does not properly work or not.

The difference $\delta_a$ calculated by the difference-calculating unit 820 is input to the judging unit 830. The judging unit 830 compares the difference $\delta_a$ with the threshold $\delta_s$.

When the difference $\delta_a$ is smaller than $\delta_s$ ($|\delta_a|<\delta_s$), continuation of measurement operation is commanded.

On the other hand, when the difference $\delta_a$ is larger than $\delta_s$ ($|\delta_a|\geq\delta_s$), the result is displayed to a user through the output unit 62.

Alternatively, the correction calculation by the correction-calculating unit 700 is terminated.

According to thus arranged third embodiment, since the estimation-judging unit 800 is provided, the accuracy of acceleration estimation by the movement-estimating unit 600 can be judged.

Further, since the continuation or termination of the correction calculation can be determined based on the judgment, erroneous measurement result output on account of erroneously correcting the measurement data can be prevented.

Incidentally, it should be understood that the surface texture measuring instrument according to the invention is not limited to the above embodiments and modifications, but may be modified in any manner as long as an object of the invention can be achieved.

Though acceleration is taken as an example of the estimated operation state quantity, scanning velocity may be used as the estimated operation state quantity as well. In this case, the relationship between the scanning velocity and the correction amount may be acquired to allow the correction calculation based on the scanning velocity.

Though acceleration is estimated by conducting a second-order differentiation on the estimated position after estimating the position based on the nominal model in the above embodiments, the nominal model may be arranged so that acceleration is directly calculated according to the position command of the scanning vector.

In the third embodiment, a low-pass filter may be provided in the estimation-judging unit 800 to cut a high-frequency noise from the actual acceleration calculated by the actual-acceleration calculating unit 810. Accordingly, judgment error on account of high-frequency noise can be prevented.

The priority application Number JP2007-202687 upon which this patent application is based is hereby incorporated by reference.

What is claimed is:

1. A surface texture measuring instrument, comprising:
   a scanning probe including a measurement piece that is brought near to or into contact with an object surface and a detection sensor that detects a relative position between the measurement piece and the object surface, the relative position between the measurement piece and the object surface being kept at a preset reference position during a scanning process;
   a scanning vector commander that commands a scanning vector indicating a subsequent moving position of the scanning probe along the object surface;
   a drive mechanism including a drive shaft that holds and three-dimensionally moves the scanning probe, the drive mechanism moving the scanning probe in accordance with the scanning vector command;
   a drive sensor that detects a drive amount of the drive mechanism;
   a movement-estimating unit that estimates a movement condition of the drive mechanism based on the scanning vector command issued by the scanning vector commander to calculate an estimated operation state quantity; and
   a correction-calculating unit that corrects a detection value of the drive sensor in accordance with the estimated operation state quantity calculated by the movement-estimating unit,
   the movement-estimating unit comprising:
   a nominal-model setting unit in which a nominal model representing signal transfer function of the scanning vector command from when the scanning vector commander issues the scanning vector command until the scanning vector command is reflected on a movement position of the scanning probe is stored,
   a position-estimating unit that calculates the position of the scanning probe as an estimated position using the scanning vector command from the scanning vector commander and the nominal model stored in the nominal-model setting unit; and a second-order differentiating unit that conducts a second-order differentiation on the estimated position of the scanning probe calculated by the position-estimating unit to calculate acceleration as the estimated operation state quantity, the correction-calculating unit comprising:

a correction-amount calculating unit that calculates a correction amount for correcting a measurement error caused on account of deformation of the drive mechanism while the drive mechanism is driven based on the estimated operation state quantity; and a measurement data synthesizing unit that synthesizes detection values of the drive sensor and the detection sensor and the correction amount calculated by the correction-amount calculating unit to acquire a measurement data.

2. The surface texture measuring instrument according to claim 1, the nominal-model setting unit comprising:

a drive mechanism nominal-model setting unit in which the nominal model of the drive mechanism is stored; and a scanning probe nominal-model setting unit in which the nominal model of the scanning probe is stored.

3. The surface texture measuring instrument according to claim 1, wherein an arc is included on a part of the object surface, the scanning vector commander issues the scanning vector command for scanning the arc, and the movement-estimating unit includes a frequency-estimating unit that calculates a rotation frequency as the estimated operation state quantity for scanning the arc based on the acceleration calculated by the second-order differentiating unit.

4. The surface texture measuring instrument according to claim 1, comprising:

an estimation-judging unit for judging an accuracy of an estimation of the movement-estimating unit, the estimation-judging unit comprising:

an actual operation state quantity calculating unit for calculating an actual operation state quantity based on a measurement value detected by the drive sensor;

a difference-calculating unit for calculating a difference between the estimated operation state quantity calculated by the movement-estimating unit and the actual operation state quantity; and a judging unit that compares the difference with a predetermined threshold to judge the accuracy of the estimation of the movement-estimating unit.

5. A surface texture measuring instrument, comprising:

a scanning probe including a measurement piece that is brought near to or into contact with an object surface and a sensor that detects a relative position between the measurement piece and the object surface, the relative position between the measurement piece and the object surface being kept at a preset reference position during a scanning process;

a scanning vector commander that commands a scanning vector indicating a subsequent moving position of the scanning probe along the object surface;

a drive mechanism including a drive shaft that holds and three-dimensionally moves the scanning probe, the drive mechanism moving the scanning probe in accordance with the scanning vector command;

a drive sensor that detects a drive amount of the drive mechanism;

a movement-estimating unit that estimates a movement condition of the drive mechanism based on the scanning vector command issued by the scanning vector commander to calculate an estimated operation state quantity; and a correction-calculating unit that corrects a detection value of the drive sensor in accordance with the estimated operation state quantity calculated by the movement-estimating unit, the movement-estimating unit comprising:

a nominal-model setting unit in which a nominal model representing signal transfer function of the scanning vector command from when the scanning vector commander issues the scanning vector command until the scanning vector command is reflected on a movement position of the scanning probe is stored, the nominal-model setting unit comprising:

a drive mechanism nominal-model setting unit in which the nominal model of the drive mechanism is stored; and a scanning probe nominal-model setting unit in which the nominal model of the scanning probe is stored, the correction-calculating unit comprising:

a correction-amount calculating unit that calculates a correction amount for correcting a measurement error caused on account of deformation of the drive mechanism while the drive mechanism is driven based on the estimated operation state quantity; and a measurement data synthesizing unit that synthesizes detection values of the drive sensor and the detection sensor and the correction amount calculated by the correction-amount calculating unit to acquire a measurement data;

wherein an arc is included on a part of the object surface, the scanning vector commander issues the scanning vector command for scanning the arc, and the movement-estimating unit includes a frequency-estimating unit that calculates a rotation frequency as the estimated operation state quantity for scanning the arc based on the acceleration calculated by the second-order differentiating unit.

* * * * *

UNITED STATES PATENT AND TRADEMARK OFFICE
CERTIFICATE OF CORRECTION

PATENT NO. : 7,715,999 B2
APPLICATION NO. : 12/184471
DATED : May 11, 2010
INVENTOR(S) : Kiyotani It is certified that error appears in the above-identified patent and that said Letters Patent is hereby corrected as shown below:

In Column 27, Line 54, in Claim 5, before "sensor" insert -- detection --.

Signed and Sealed this

Thirteenth Day of July, 2010

David J. Kappos
*Director of the United States Patent and Trademark Office*